United States Patent
Itwaru

(10) Patent No.: US 9,785,935 B2
(45) Date of Patent: Oct. 10, 2017

(54) SPLIT MOBILE PAYMENT SYSTEM

(75) Inventor: Mark Itwaru, Toronto (CA)

(73) Assignee: Riavera Corp., Toronto (CA)

( * ) Notice: Subject to any disclaimer, the term of this patent is extended or adjusted under 35 U.S.C. 154(b) by 0 days.

(21) Appl. No.: 13/469,864

(22) Filed: May 11, 2012

(65) Prior Publication Data

US 2013/0124412 A1    May 16, 2013

Related U.S. Application Data

(63) Continuation-in-part of application No. PCT/CA2012/000223, filed on Mar. 12, 2012, and a
(Continued)

(30) Foreign Application Priority Data

May 27, 2011    (CA) ...................................... 2741240

(51) Int. Cl.
*G06Q 20/32* (2012.01)
*G06Q 20/20* (2012.01)
(Continued)

(52) U.S. Cl.
CPC ........... *G06Q 20/322* (2013.01); *G06Q 20/02* (2013.01); *G06Q 20/20* (2013.01); *G06Q 20/3276* (2013.01); *G06Q 30/02* (2013.01)

(58) Field of Classification Search
CPC ....................................................... G06Q 20/40
(Continued)

(56) References Cited

U.S. PATENT DOCUMENTS 5,729,594 A    3/1998  Klingman
5,778,173 A    7/1998  Apte
(Continued)

FOREIGN PATENT DOCUMENTS

CA         2769235 A1     2/2011
DE    102007059816 A1     6/2009
(Continued)

OTHER PUBLICATIONS

International Search Report and Written Opinion dated Aug. 27, 2012 issued from the Canadian Intellectual Property Office relating to PCT International Patent Application No. PCT/CA2012/000453.
(Continued)

*Primary Examiner* — Vanel Frenel
(74) *Attorney, Agent, or Firm* — Grant Tisdall; Gowling WLG (Canada) LLP

(57) ABSTRACT

Systems and methods for providing enhanced transaction security via use of a split mobile payment system which allows a Consumer to pay for a purchase using his mobile device without exposing Payment Account information to the merchant. The split mobile payment system may include a mobile payment application (MPA), running on a Consumer's mobile device, which can communicate with a Payment Platform and merchant's in-store Point of Sale Payment Application (PPA). A barcode can be used as one means for identifying a Consumer's Payment Account to the Payment Platform via the PPA. In the event of a PIN being required, the PIN may be entered by the Consumer via the mobile device rather than the merchant's PPA.

19 Claims, 8 Drawing Sheets

Related U.S. Application Data continuation-in-part of application No. 13/105,803, filed on May 11, 2011, and a continuation-in-part of application No. 13/397,215, filed on Feb. 15, 2012, and a continuation-in-part of application No. 13/397,297, filed on Feb. 15, 2012.

(60) Provisional application No. 61/485,075, filed on May 11, 2011.

(51) Int. Cl.
  *G06Q 20/02* (2012.01)
  *G06Q 30/02* (2012.01)

(58) Field of Classification Search
  USPC ............ 705/16, 17, 21, 44, 39, 64; 235/379, 235/380, 493
  See application file for complete search history.

(56) References Cited

U.S. PATENT DOCUMENTS

| | | | |
|---|---|---|---|
| 5,799,285 | A | 8/1998 | Klingman |
| 5,903,721 | A | 5/1999 | Sixtus |
| 5,923,735 | A | 7/1999 | Swartz et al. |
| 5,963,915 | A | 10/1999 | Kirsch |
| 5,970,475 | A | 10/1999 | Barnes et al. |
| 5,992,752 | A | 11/1999 | Wilz, Sr. et al. |
| 6,012,144 | A | 1/2000 | Pickett |
| 6,038,589 | A | 3/2000 | Holdsworth |
| 6,058,250 | A | 5/2000 | Harwood et al. |
| 6,078,902 | A | 6/2000 | Schenkler |
| 6,086,618 | A | 7/2000 | Al-Hilali et al. |
| 6,088,683 | A | 7/2000 | Jalili |
| 6,138,146 | A | 10/2000 | Moon et al. |
| 6,233,565 | B1 | 5/2001 | Lewis et al. |
| 6,332,134 | B1 | 12/2001 | Foster |
| 6,675,008 | B1 | 1/2004 | Paik et al. |
| 6,704,873 | B1 | 3/2004 | Underwood |
| 7,379,921 | B1 | 5/2008 | Kiliccote |
| 7,387,250 | B2 | 6/2008 | Muni |
| 7,581,257 | B1 | 8/2009 | O'Hara |
| 8,016,187 | B2 | 9/2011 | Frantz et al. |
| 8,275,699 | B2 | 9/2012 | Shader et al. |
| 8,321,315 | B2 * | 11/2012 | Abel ................ G06Q 20/02 235/380 |
| 2002/0062281 | A1 | 5/2002 | Singhal |
| 2002/0066039 | A1 | 5/2002 | Dent |
| 2002/0066042 | A1 | 5/2002 | Matsumoto et al. |
| 2002/0069165 | A1 * | 6/2002 | O'Neil ............... G06Q 20/04 705/40 |
| 2002/0077976 | A1 | 6/2002 | Meyer et al. |
| 2002/0107745 | A1 | 8/2002 | Loeser |
| 2003/0195843 | A1 | 10/2003 | Matsuda et al. |
| 2005/0029358 | A1 | 2/2005 | Mankins |
| 2005/0125301 | A1 | 6/2005 | Muni |
| 2005/0197968 | A1 | 9/2005 | Das et al. |
| 2007/0119917 | A1 | 5/2007 | Tomikawa et al. |
| 2007/0156579 | A1 * | 7/2007 | Manesh ............. G06Q 30/04 705/39 |
| 2007/0194123 | A1 | 8/2007 | Frantz et al. |
| 2007/0244811 | A1 | 10/2007 | Tumminaro |
| 2007/0255620 | A1 | 11/2007 | Tumminaro et al. |
| 2008/0172314 | A1 | 7/2008 | Hahn-Carlson |
| 2008/0222048 | A1 | 9/2008 | Higgins et al. |
| 2008/0285755 | A1 | 11/2008 | Camus et al. |
| 2008/0313081 | A1 | 12/2008 | Wee |
| 2009/0090783 | A1 | 4/2009 | Killian et al. |
| 2009/0108080 | A1 | 4/2009 | Meyer et al. |
| 2009/0222353 | A1 | 9/2009 | Guest et al. |
| 2009/0240626 | A1 | 9/2009 | Hasson et al. |
| 2009/0254479 | A1 | 10/2009 | Pharris |
| 2009/0254485 | A1 | 10/2009 | Baentsch et al. |
| 2009/0266893 | A1 | 10/2009 | Chen |
| 2010/0138344 | A1 * | 6/2010 | Wong ................ G06Q 20/10 705/44 |
| 2010/0169223 | A1 | 7/2010 | Yuan |
| 2010/0211506 | A1 | 8/2010 | Chang et al. |
| 2011/0145093 | A1 | 6/2011 | Paradise et al. |
| 2011/0212707 | A1 | 9/2011 | Mahalal |
| 2011/0218871 | A1 * | 9/2011 | Singh ................. G06Q 20/10 705/17 |
| 2011/0244920 | A1 | 10/2011 | Coppinger |
| 2011/0251892 | A1 * | 10/2011 | Laracey ........... G06Q 30/0253 705/14.51 |
| 2011/0276418 | A1 * | 11/2011 | Velani ................ G06Q 20/20 705/16 |
| 2012/0030121 | A1 | 2/2012 | Grellier |
| 2012/0066081 | A1 | 3/2012 | Shader et al. |
| 2012/0078751 | A1 | 3/2012 | Macphail et al. |
| 2012/0130889 | A1 | 5/2012 | Lyons et al. |
| 2012/0136797 | A1 | 5/2012 | Coppinger |
| 2012/0290418 | A1 | 11/2012 | Itwaru |

FOREIGN PATENT DOCUMENTS

| | | |
|---|---|---|
| EP | 0765068 A2 | 3/1997 |
| EP | 0813325 A2 | 12/1997 |
| EP | 0926611 A2 | 6/1999 |
| EP | 1921578 A1 | 5/2008 |
| EP | 2073160 A1 | 6/2009 |
| EP | 2088549 A1 | 8/2009 |
| WO | 9637848 A1 | 11/1996 |
| WO | 0195591 A1 | 12/2001 |
| WO | 02102133 A2 | 12/2002 |
| WO | 2011112752 A1 | 9/2011 |
| WO | 2011127354 A2 | 10/2011 |
| WO | 2011130422 A2 | 10/2011 |
| WO | 2012111019 A1 | 8/2012 |
| WO | 2012151660 A1 | 11/2012 |
| WO | 2012158506 A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated May 24, 2012 issued from the Canadian Intellectual Property Office relating to PCT International Patent Application No. PCT/CA2012/000223.

International Search Report and Written Opinion dated Jul. 30, 2012 issued from the Canadian Intellectual Property Office relating to PCT International Patent Application No. PCT/CA2012/000452.

Ion, et al., "Don't trust POS terminals! Verify in-shop payments with your phone", presented at Pervasive 2008 Sixth International Conference on Persuasive Computing, Sydney Australia, http://www.persuasive2008.org/.

International Search Report and Written Opinion dated Apr. 15, 2013 issued from the Canadian Intellectual Property Office relating to PCT International Patent Application No. PCT/CA2013/000135.

International Search Report and Written Opinion dated Apr. 29, 2013 issued from the Canadian Intellectual Property Office relating to PCT International Patent Application No. PCT/CA2013/000136.

* cited by examiner

SPLIT MOBILE PAYMENT SYSTEM

TECHNICAL FIELD

The present disclosure relates to a security-enhanced, mobile device payment processing system facilitating transfer of funds at a point of sale using obfuscated payment account information to expedite payment processing.

BACKGROUND

Mobile payment is an alternative payment method that allows consumers to use a mobile device (e.g. such as a smart phone) to purchase goods or services, instead of using cash, cheque or credit card. Mobile payment processing has been the "holy grail" of mobile commerce since the advent of the cell-phone.

However, the lack of efficient and easy-to-use mobile payment processing solutions has heretofore relegated the mobile payment processing market to predominantly the purchase of downloadable items such as ringtones and music. Although many companies have tried, no one company has yet introduced a comprehensive mobile payment processing technology that has seen wide spread acceptance by either merchants or consumers.

In addition, consumers' concerns over the security of mobile payment systems have hindered the widespread adoption of such technology. In traditional credit card or debit card based Point of Sale systems, when a consumer makes a purchase, the consumer's sensitive payment account information is generally processed between a merchant's POS terminal and a Payment Platform (such as that of a credit card company, bank or other financial institution). Further, the consumer is typically required to enter personal identification numbers ("PINs"), or other such verification information such as passwords, on the merchant's POS terminal. While such technology is widely adopted, in the case of mobile payment systems in particular, there remains a need for a mobile payment system which can provide for enhanced security by reducing much of such payment processing functions from the merchant POS terminal.

In particular, providing one entity with some control in how their personal financial information is provided to directly another entity (e.g. between consumer and merchant) involved in the funds transfer has so far been elusive. This inability to involve more entity control of the funds transfer between entities while at the same time streamlining the amount of time and information entities must share with each other during funds transfer has effectively relegated experience in online electronic direct funds transfer to that of yesterday rather than the future. In particular, barcodes have been used in an effort to speed up the customer shopping experiences by providing merchant terminals information about the product when scanned through a checkout scanner, i.e. the price and brief description of the product that the barcode is attached/applied to. However, any use of barcodes outside of the customer shopping experience, other than as a look up service for a price of a product on a product by product basis, is simply not available.

Further, mobile payment technologies have been contemplated using mobile devices that utilize Radio-Frequency Identification ("RFID") and/or Near Field Communication ("NFC") technologies as the means for identifying a Consumer/Consumer's account. However, with such devices, possession equals ownership, meaning that a lost device can potentially be used by a fraudster to make unauthorized purchases. There is a need therefore to provide for a mobile payment system having enhanced security features.

At the same time, developments in the field of mobile commerce are being facilitated by improved functionality and features available on mobile devices, and by such functionality and features becoming more commonplace on current mobile devices. For example, cell phones, smart phones and tablet computers nowadays are commonly integrated, multi-functional devices. In addition to their core, basic functionality, they will often have, or can be configured to have, web-enabled functionality, various other communication capabilities (e.g., e-mail, text, wi-fi, etc.), camera functions, scanning and graphical image handling functionalities and other capabilities. Graphical interfaces of desktop computers, including image processing capabilities, have also become more advanced in their functionality and provided features. However, to date, the direct funds transfer experience between entities (either in person or online) has not benefited from these advanced functionality and provided features of desktop GUIs and mobile devices.

SUMMARY

Presently there is a need for a system and method to facilitate the transfer of funds between entities such as a consumer and a merchant using a code such as optical machine readable images to represent consumer account information that addresses at least one of the identified problems in the current state of the art.

Currently, providing one entity with some control in how their personal financial information is provided to directly another entity involved in the funds transfer has so far been elusive. This inability to involve more entity control of the funds transfer between entities while at the same time streamlining the amount of time and information entities must share with each other during funds transfer has effectively relegated experience in online electronic direct funds transfer to that of yesterday rather than the future. Contrary to current systems there is provided a system and method for a split transaction system for coordinating processing of a purchase transaction between a merchant and a consumer over a communications network, the split transaction system comprising: a computer processor coupled to a memory, wherein the computer processor is programmed to coordinate processing of the purchase transaction by: receiving the purchase transaction from the merchant including merchant identification information and consumer identification information, such the consumer identification includes consumer financial account information that is unusable to directly access the corresponding financial account of the consumer; contacting the consumer to notify the consumer of the received purchase transaction and to request confirmation information from the consumer; receiving the confirmation information from the consumer and generating a corresponding funds transfer request using a funds amount associated with the merchant identification information and a financial account number of the financial account of the consumer; and sending the funds transfer request to an account processing system for subsequent settlement of the funds amount with the financial account of the consumer.

A first aspect provided is a split transaction system for coordinating processing of a purchase transaction between a merchant and a consumer over a communications network, the split transaction system comprising: a computer processor coupled to a memory, wherein the computer processor is programmed to coordinate processing of the purchase transaction by: receiving the purchase transaction from the merchant including merchant identification information and consumer identification information, such the consumer identification includes consumer financial account information that is unusable to directly access the corresponding financial account of the consumer; contacting the consumer to notify the consumer of the received purchase transaction and to request confirmation information from the consumer; receiving the confirmation information from the consumer and generating a corresponding funds transfer request using a funds amount associated with the merchant identification information and a financial account number of the financial account of the consumer; and sending the funds transfer request to an account processing system for subsequent settlement of the funds amount with the financial account of the consumer.

A second aspect provided is a method for coordinating processing of a purchase transaction between a merchant and a consumer over a communications network, the split transaction method comprising: receiving the purchase transaction from the merchant including merchant identification information and consumer identification information, such the consumer identification includes consumer financial account information that is unusable to directly access the corresponding financial account of the consumer; contacting the consumer to notify the consumer of the received purchase transaction and to request confirmation information from the consumer; receiving the confirmation information from the consumer and generating a corresponding funds transfer request using a funds amount associated with the merchant identification information and a financial account number of the financial account of the consumer; and sending the funds transfer request to an account processing system for subsequent settlement of the funds amount with the financial account of the consumer.

A third aspect provided is A non-transitory computer readable storage medium with an executable program application stored thereon, the program application configured for coordinating processing of a purchase transaction involving a consumer and a merchant, the program application configured as a client of a payment service platform accessible over a communications network, wherein the program application instructs a computer processor to perform the following steps of: providing consumer identification information to the merchant, such the consumer identification includes consumer financial account information that is unusable to directly access the corresponding financial account of the consumer; receiving a notification from the payment service platform of the purchase transaction including merchant identification information and a request to provide confirmation information from the consumer pertaining to the purchase transaction; sending the confirmation information to the payment service platform including confirmation of a funds amount associated with the merchant identification information; and receiving notification of subsequent settlement of the funds amount with the financial account number pertaining to the financial account of the consumer.

The present disclosure is directed to a mobile payment system (and associated method) which allows a Consumer to use his/her Mobile Device to facilitate/effectuate a financial transaction at a Point of Sale, and which has enhanced security features. It is contemplated that within the context of the present disclosure, "Mobile Device" can be used to refer to any portable, wireless, web-enabled, electronic device, including cell phone, electronic PDA, computer tablet, smart phone or a similar device. The disclosed mobile payment system, sometimes referred to herein as a split mobile payment system ("split mobile payment system"), provides a solution that does not require the Consumer, when making such a payment, to expose any confidential credit card, debit card or financial information to the merchant; nor does it need the Consumer to enter any credit card or debit card PIN numbers into a merchant's point of sale application (PPA) Terminal.

The split mobile payment system makes use of a mobile payment application ("MPA") in the form of a software application which runs on the Consumer's Mobile Device. The MPA may come preinstalled on the Mobile Device and/or may be downloaded on to the Mobile Device. The MPA is configured to be able to communicate with the Payment Platform via the Internet using the Mobile Device's web-enabled functionality. The merchant's Point of Sale Payment Application ("PPA"—the software application running on the merchant's POS system or network, and used to facilitate POS transactions) is also configured to be able to communicate with a Payment Platform either via the Internet or via a dedicated connection. It is contemplated that such communications will include security features such as data encryption, as necessary.

The MPA communicates the Consumer's Payment Account Identifier (which is used to identify to the Payment Platform, the Consumer's Payment Account that the funds are to be transferred from to pay the merchant) to the merchant's PPA, which the PPA will pass on to the Payment Platform. It is contemplated that several mechanisms can be used to communicate such Payment Account Identifier to the PPA. In one embodiment, the use of what shall be referred to herein as "Image Technology" contemplates that the Payment Account Identifier be in the form of a 1-D (linear) barcode, 2-D barcode, hologram or the like (which for ease of reference will generally be referred to herein, as a barcode). In this embodiment, the barcode is displayed on the screen display of the Consumer's Mobile Device, and presented to the merchant to be scanned (e.g., through a PPA Terminal). In another embodiment, the use of what shall be referred to herein as "Transmitting Technology" contemplates that the Payment Account Identifier or information identifying the Consumer's Payment Account ("Payment Account Identifying Information") will simply be transmitted from the Consumer's Mobile Device to the PPA using such Transmitting Technology (i.e. NFC, Bluetooth, Infrared or other similar shortrange, communication technology). The merchant's PPA will be suitably equipped to receive such communication from the MPA/Mobile Device. It is contemplated that such communications will be suitably encrypted.

Within the context of the present disclosure, the majority of the functionality of a traditional POS terminal is transferred to the Consumer's Mobile Device, resulting in the majority of the steps of a purchase transaction (particularly those involving relatively sensitive information) taking place between the Consumer's Mobile Device and the Payment Platform (rather than between the merchant POS and a Payment Platform, as is typically the case in traditional retail credit card transactions).

Specifically:
  The Consumer selects the type of payment transaction (e.g., credit card, debit card, bank debit, coupon or e-Wallet) using the Consumer's Mobile Device.
  Debit card and/or credit card PIN authentication is performed between the Consumer's Mobile Device and the Payment Platform, as opposed to between the PPA and the Payment Platform.

Transaction failure or insufficient funds notifications are sent to the Consumer's Mobile Device first, thereby allowing the Consumer to choose a different payment option and thus avoiding unnecessary potential embarrassment.

In addition, the split mobile payment system provides several additional layers of security (some of which can be optional) that operate to further reduce the chances of the Consumer's Payment Account Information being compromised. Within the context of the disclosed system, a user is needed to log in to the MPA (i.e., the MPA is password-protected) in order to activate it on the Consumer's Mobile Device. In one embodiment, a user is also needed to log in to use the Mobile Device in the first place. In the context of the present disclosure, all relatively sensitive Payment Account Information of the Consumer is housed on the Payment Platform and not the Consumer's Mobile Device. Furthermore, all confirmations of charges to or debits from the Consumer's Payment Account(s) require a confirmation by the Consumer from the Consumer's Mobile Device, as opposed to from the POS Terminal.

As an optional further security feature of the split mobile payment system, a file photograph of the Consumer or Payment Account holder can be sent to the in-store POS Payment Application (PPA) to request the merchant/cashier to verify the identity of the Consumer. Further, it is contemplated that the disclosed system will provide for a confirmation e-mail (or other electronic communication) regarding the transaction to be sent to the Mobile Device owner. All the foregoing of which can prevent, hamper or deter unauthorized use of the MP A or split mobile payment system. Furthermore, in the eventuality of a credit card or debit card PIN being needed, such PIN is entered by the Consumer via the Consumer's Mobile Device, rather than via the merchant's POS terminal, thus reducing the chances of the PIN being compromised.

The following outlines an exemplary embodiment of the process in action.

1. At the Point of Sale, the Consumer launches and logs in to the MP A on his/her Mobile Device. This creates an open transaction on the Payment Platform.

2. The Payment Account Identifier, in the form of a barcode, is presented on the screen display of the Mobile Device. This barcode is scanned by the merchant (e.g., using the PPA Terminal) to initiate the payment transaction. The barcode is unique and serves to identify the Consumer's Payment Account(s) when the data contained in the barcode is communicated to a Payment Platform via the PPA. The Consumer's Payment Account may reside on a Payment Platform hosted by a financial institution, a credit issuing company, an E-wallet service provider, a money transfer service provider, or the like. The information on the Payment Account Identifier/barcode and the purchase transaction information is sent by the PP A to the Payment Platform via the Internet or a dedicated connection.

3. In the event that the Consumer has sufficient funds in their designated account, a request for confirmation of purchase is sent to the Consumer's Mobile Device from the Payment Platform. The MPA presents the Consumer with options to accept or decline the transaction.

4. At this point the MPA may prompt the Consumer to enter his/her credit card or debit card PIN number. If a PIN number is required, the Consumer enters his/her PIN number into a field presented by the MPA and that PIN number along with the Consumer's confirmation of the transaction is sent via the Internet or dedicated connection to the Payment Platform for authentication.

5. If no PIN number IS required, the MPA just sends the confirmation to the Payment Platform.

6. Upon accepting a confirmation from the Consumer, the Payment Platform processes the transaction and notifies both the merchant and the Consumer of the completion of the transaction.

In another embodiment, where use of a Transmitting Technology is contemplated instead of Image Technology, step 2 above may be replaced by step 2b below:

2b. The Payment Account Identifier or the Consumer's Payment Account Identifying Information is transmitted from the MPA/Mobile Device using the Transmitting Technology to the PPA. The PPA sends this information and the purchase transaction information to the Payment Platform via the Internet or a dedicated connection.

BRIEF DESCRIPTION OF THE DRAWINGS

Exemplary embodiments of the invention will now be described in conjunction with the following drawings, by way of example only, in which.

DESCRIPTION OF EMBODIMENTS

Figure 1:
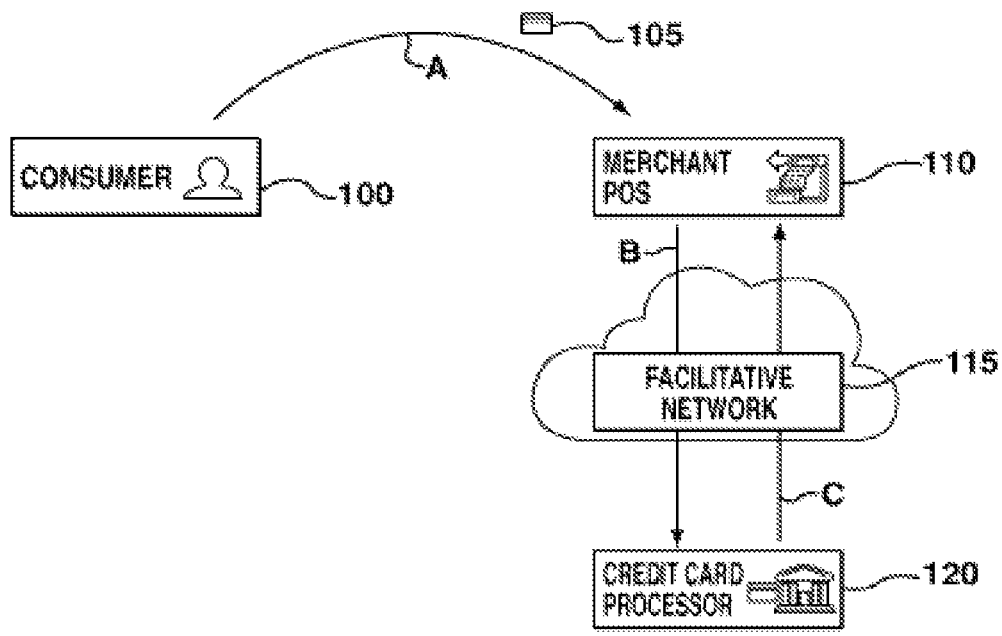
FIG. 1 is a simplified, schematic representation of a typical retail credit card purchase.

Glossary. For the purposes of this disclosure, the following terms have been ascribed the following meanings, with reference to FIG. 3:

Consumer 18—a Mobile Device 8 user; an individual making a purchase at a Point of Sale terminal 12 of a merchant 16.

E-wallet—any electronic stored value system.

Point of Sale Terminal 12—any type of electronic payment terminal 12 including, ATM machines, vending machines and standard in-store point of sale terminals, such that the payment terminal implements a merchant payment application/interface 14 that is in communication with a payment service platform 20.

Code data 4—is a lookup or index identifier (ID) that is received by the Point of Sale Terminal 12 (e.g. via a merchant application 14) that can be subsequently provided to and used by a payment service platform 20 to identify sensitive payment account information 61 of the consumer 18, as mapped in a lookup table 63. For example, the lookup identifier provided as the code data 4 of "ABC123" could be received (via the merchant terminal 12) and used by the payment service platform 20 to lookup from the lookup table 63 the actual consumer credit card number (or other financial account number). This actual financial account number would then be provided to and used by financial institutions of the account processing system 2 to effect transfer of funds from the consumer financial payment account 72 identified by the financial account number retrieved from the lookup table 63. It is recognized that the code data 4 can be included in a generated barcode 200 or can be provided to the merchant application 14 (via the consumer 18) as an unencoded code data 4 (i.e. unencoded textual information).

Payment Service Platform 20—the computing infrastructure in communication with, for example, banks, other financial institutions, E-wallet service providers or money transfer service provider network (represented as account processing system 2), that is used to authenticate, for example, account holders, house account holder accounts and to facilitate the electronic payment between account holder accounts.

Payment Account 72—an financial account held by a Consumer 18 with a financial institution, Ewallet provider or Credit Issuing Company (including gift certificates, gift cards and coupons), and the like (represented in account processing system 2), such as but not limited to a credit card account, a bank account, and/or a line of credit account number, etc. It is recognized that access to the Payment Account requires access information from the consumer such as identity confirmation data 3 including passwords and/or PIN.

Payment Account Information 61—Sensitive information pertaining to the Payment Account 72, including but not limited to account holder's name, name of financial institution, account login information, account numbers, account balances, passwords and PIN numbers for accessing the account. It is recognized that the payment account information 61 is used by an account processing system 2 to access and effect the actual transfer of funds from the identified account 72 of the consumer 18 from the payment account information 61. It is also recognized that, as further described below, the payment account information 61 is withheld from the point of sale terminal 12 of the merchant 16 and is instead communicated directly between the Payment Service Platform 20 and the consumer 18 and communicated directly between the Payment Service Platform 20 and the account processing system 2.

POS or Point of Sale—the location where a purchase/sale transaction takes place which originates a payment transaction 5 request (e.g. a request from a merchant 16 to receive funds in exchange for a product being provided by the merchant 16 to the consumer 18).

Split Transaction Process—the transaction process that divides the information sent during a retail POS purchase between the Point of Sale Terminal 12, the Consumer's Mobile Device 8 and the Payment Service Platform 20 (via the payment interface 15).

Figure 3:
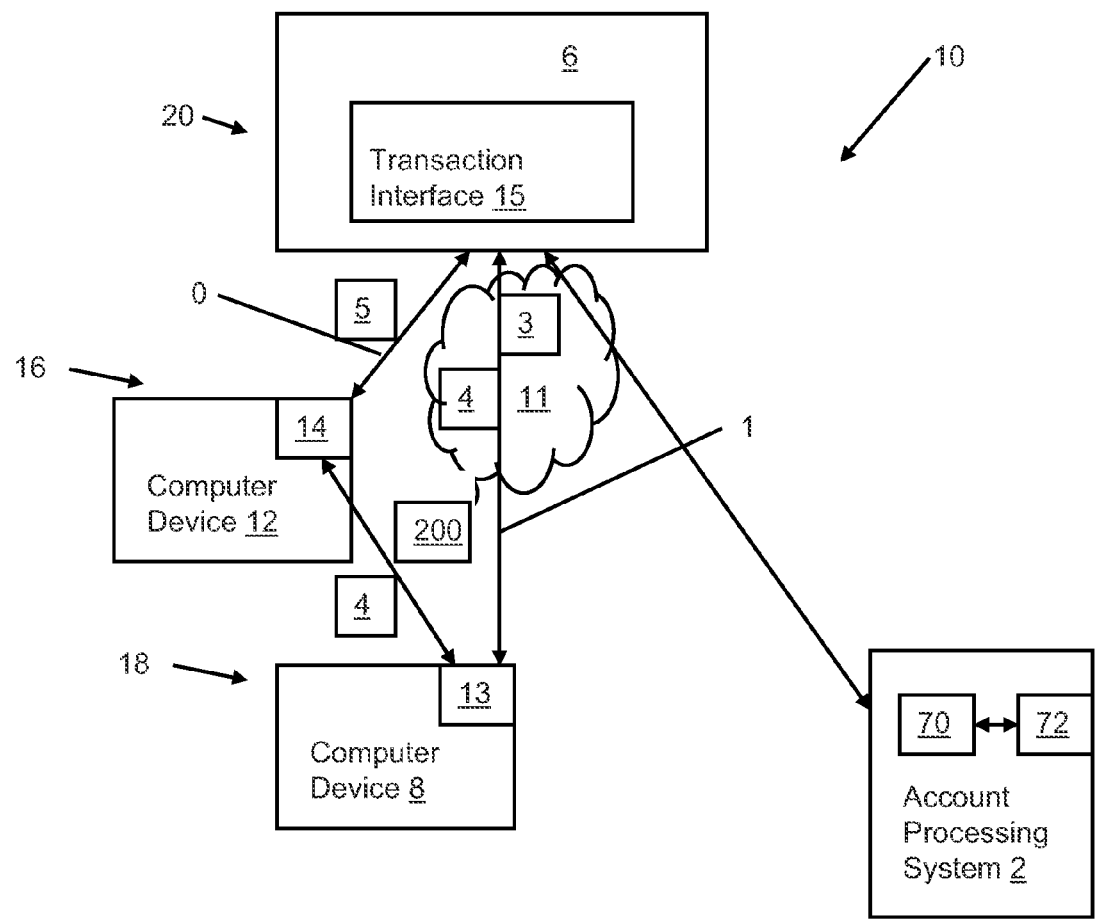
FIG. 3 is a block diagram of components of a split mobile payment system.

Referring to FIG. 3, the present disclosure is directed to a mobile payment system 10 and associated method implemented over a computer network(s) 11 such as the Internet and/or other public and private (e.g. VPN) inter- and extranets, wherein the system provides for enhanced transaction security via use of a split mobile payment configuration. The split mobile payment configuration can comprise a software application or mobile payment application 13, which runs on the Consumer's mobile device 8 and which can communicate with the Payment Service Platform 20 and the merchant's in-store Point of Sale Payment Application 14. The split mobile payment system 10 allows the Consumer 18 to pay for a purchase at a point of sale using their mobile device 8 without exposing Payment Account information 61 to the merchant 16. Under the split mobile payment system 10, the Consumer's 18 sensitive Payment Account Information 61 can be processed between the Consumer's mobile device 8 and the Payment Service Platform 20 via network connection 1, while only a code 4 (e.g. a picture code or alphanumeric code) representing an identifier related to the Payment Account information 61 is shared between the consumer 18 and the merchant 16. It is recognized that the code 4 is recognized and used by the Payment Service Platform 20 to identify the consumer's actual stored Payment Account information 61 (see FIG. 4).

In the event of a credit card or debit card PIN being needed as confirmation data 3 of the purchase transaction request 5 sent by the merchant 16 to the payment service platform 20, the PIN can be entered by the Consumer 18 via the user interface of the Consumer's mobile device 8 rather than via the merchant's point of sale terminal 12, thus reducing the chances of the consumer's PIN being compromised as the PIN information is not shared directly with the point of sale terminal 12. Further, an advantage with only providing the code 4 (only representing the payment account information 61 of the consumer 18), by the consumer 18 to the merchant 16, is that the merchant 16 does not have any direct knowledge of the payment account number of the consumer 18 (as this information is only known to the payment service platform 20 and/or the respective financial institution of the account processing system 2). It is recognized that separate network 11 connections 0,1 can be used to transmit the purchase transaction 5 (over network connection 0) between the merchant device 12 and the payment service platform 20 and the confirmation data 4 (over network connection 1) between the consumer device 8 and the payment service platform 20.

The computer network 11, often simply referred to as a network, can be a collection of hardware components and computers interconnected by communication channels (i.e. individual network connections 0,1) that allow sharing of resources and information between individual pairs of devices 6,8,12. Where at least one process in one device is able to send/receive data to/from at least one process residing in a remote device, then the two devices are said to be in a network and communicating using their respective network connection of communication channel 0,1. It is recognized that the network 11 can be comprised of wired and/or wireless communication channels. It is recognized that the individual devices 6,8,12 are individual nodes on the network 11, such that network connection 0 is defined as established between paired devices 6,12 as communication endpoints of the network connection 0, and network connection 1 is defined as established between paired devices 6,8 as communication endpoints of the network connection 0. In communication networks 11, a node is a connection point, either a redistribution point or a communication endpoint (some terminal equipment). The definition of a node depends on the network and protocol layer referred to. A physical network node is an active electronic device 6,8,12 that is attached to the network 11, and is capable of sending, receiving, or forwarding information over their respective communications channel (e.g. network connection 0 or network connection 1). If the network 11 in question is the Internet or an intranet or other extranet, many physical network nodes are host computers (e.g. devices 6,8,12), also known as Internet nodes, identified by an IP address, and all hosts are physical network nodes. However, some datalink layer devices such as switches, bridges and WLAN access points do not have an IP host address (except sometimes for administrative purposes), and are not considered as Internet nodes or hosts, but as physical network nodes and LAN nodes.

In addition, the split mobile payment system 10 can provide additional layers of security to that already present via the network 11 architecture that inhibit or deter the Consumer's Payment Account information 61 from being compromised. For example, one additional layer is where the Consumer 18 may be required to login in order to use the mobile payment application 13. Optionally, a photograph of the Consumer 18 may be sent to the merchant terminal 12 from the payment service platform 20 for identity verification by the merchant 16, as part of the processing related to the purchase transaction 5 submitted to the payment service platform 20 by the merchant 16. A confirmation e-mail or other electronic communication 3 can be sent to a designated e-mail address of the Consumer 18 (e.g. to the consumer device 8) from the payment service platform 20, also as part of the processing related to the purchase transaction 5 submitted to the payment service platform 20 by the merchant 16.

In terms of data communication directly between the merchant device 12 and the consumer device 8, this communication data 4 can be considered outside of the individual network communications 0,1 in relation with the payment service platform 20 over the network 11. A barcode 200 (see FIG. 5) is one example of the code data 4, which is identifiable (e.g. is generated using an encoder that is compatible with a decoder implemented by the payment service platform 20) by a payment interface 15 of the payment service platform 20 in accessing the Consumer's Payment Account (stored in the payment account information 61 in storage accessible by the payment interface 15) to the account processing system 2. In one embodiment, at the point of sale, the Consumer logs into their payment application 13. A barcode 200 containing the Consumer's encrypted Payment Account Identifier 4 (i.e. code data 4) can be displayed on the screen of the mobile device 8. The barcode 200 can then be scanned by the Merchant device 12 using the merchant application 14. The scanned barcode information and all of the purchase information (i.e. total, Retailer ID etc.) can be sent as the purchase transaction 5 by the merchant terminal 12 via the Internet 11 or a dedicated connection (e.g. via network connection 0) to the Payment Service Platform 20. The Payment Service Platform 20 can process the purchase transaction 5 by using the code data 4 to identify the actual identity of the consumer 18 and their actual payment account information 61 and send a "request for confirmation" request 3 (e.g. via network connection 1) associated with the purchase transaction 5 to the payment application 13 on the Consumer's mobile device 8. The Consumer 18 can then confirm or decline the request for confirmation as a confirmation response 3 back to the Payment Service Platform 20 (e.g. via network connection 1), which can then interact with the account processing system 2 to effect the transfer of funds indicated in the original purchase transaction 5 between the accounts 70,72 of the merchant 16 and the consumer 18.

The Consumer's 18 confirmation or declination of the purchase transaction 5 can be sent through the Internet or dedicated connection to the Payment Service Platform 20 via network connection 1, which can send (e.g. via network connection 0) a purchase transaction response 5 to the merchant terminal 12 (either before or after receiving confirmation from the account processing system 2 of the specified funds transfer between the accounts 70,72). It is recognized that the transfer of funds between the accounts 70,72, as confirmed by the account processing system 2, can be a real-time executed funds transfer and/or a promise to transfer, depending upon the effective speed at which the account processing system 2 can effect the actual funds transfer). In any event, evidence of successful funds transfer in the purchase transaction response 5 can be acceptable as either real-time (e.g. same day) or batch transfer (e.g. next day) of the funds between the accounts 70,72. A confirmation can also be sent to the payment application 13 and an e-mail sent to the Consumer's designated e-mail address indicating successful funds transfer. The purchase transaction 5 can then be considered closed or otherwise completed by the Payment Service Platform 20, the merchant application 14 and/or the payment application 13, as desired.

In another embodiment, the code data 4 can be implemented as a short code service (i.e. unencoded textual information as compared to coded textual information in the form of a barcode 200). The way this works is that instead of scanning or otherwise supply the barcode 200 as the code data 4, the consumer 18 provides a short code (e.g. a sequence of characters including numeric characters and/or alpha characters) that is also known to the Payment Service Platform 20 as the code data 4 used in identifying the actual payment account information 61 stored and accessible by the payment interface 15. Therefore, after providing the code data 4 as a series of numeric characters and/or alpha characters to the merchant application 14, the rest of the split purchase transaction 5 process is exactly the same. One advantage in using the short code is that it works in situations where generating or otherwise scanning/processing the barcode 200 is not feasible by the merchant application 14 and/or the payment application 13.

In another embodiment, the communication means for identifying the Consumer's Payment Account to the Payment Service Platform 20 via the merchant terminal 12 (i.e. via the merchant application 14) can involve the transmission of the Consumer's Payment Account Identifying Information 4 from the Mobile Device 8 (i.e. via the payment application 13) to the merchant terminal 12 (i.e. via the merchant application 14) using NFC, Bluetooth, Infrared or other similar short-range, communication technology. In the case of a short code being used as the code data 4, the transmission of this code data 4 information to the merchant may be something as simple as verbal transmission between the merchant 16 and consumer 18 and/or by simply reading of the code data 4 off of the screen of the device 8 by the merchant 16—in the case where the code data 4 is displayed on the screen of the device 8 (e.g. via interaction with the payment application 13 by the consumer 18). Another embodiment is where a speaker of the device 8 is used by the payment application 13 to audibly communicate the code data 4 to the merchant 16.

In contrast to the above described split mobile payment system 10, FIG. 1 provides, for comparison purposes, a simplified illustration of a traditional retail purchase process using a credit card, according to an embodiment. A Consumer 100 wishing to make a purchase at a retail establishment presents his/her credit card 105 to the merchant. The credit card 105 is swiped in the merchant's POS terminal 110. Where appropriate, the Consumer inputs an account PIN into the POS terminal 110 for verification purposes. The merchant POS terminal 110 initiates a transaction request with the credit card processor 120 or processing institution via the Internet or other facilitative network 115. The credit card processor 120 returns transaction confirmation details to the merchant POS terminal 110 for display to the Consumer 100. It is recognized that in this case all sensitive consumer account information such as actual credit card number, personal name, as well as PIN information is relayed through the POS terminal 110 (under control of the merchant 16) to the credit card processor 120 over the network 115. This credit card process is contrary to operation of the split mobile payment system 10 whereby consumer sensitive information of PIN and/or credit card numbers is transmitted directly between the payment interface 15 and the consumer device 8 over the network 11 (e.g. via network connection 1) while the representative code data 4 and product purchase information of the purchase transaction 5 is communicated between the merchant device 12 and the payment interface 15, thereby providing the advantage of restricting access by the merchant 16 to the payment account information 61 (in this case PIN and credit card number) of the consumer 18.

Figure 2:
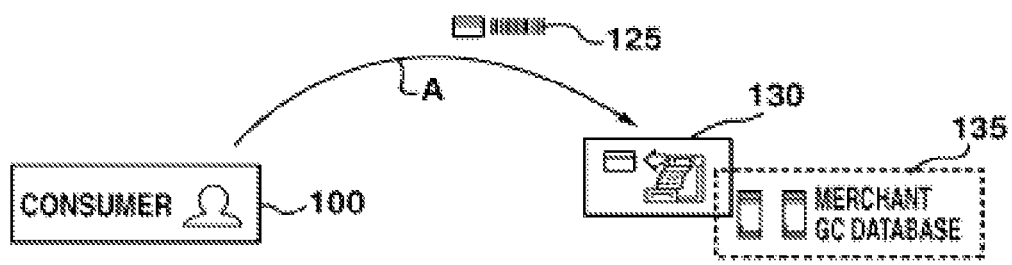
FIG. 2 is a simplified, schematic representation of a typical merchant gift card purchase.

FIG. 2 illustrates a traditional purchase process using a merchant gift card, according to an embodiment. Consumer 100 wishing to make a purchase using an electronic stored value gift card 125 presents the gift card 125 to the merchant. The gift card 125 is swiped or scanned using the merchant POS terminal or cash register 130. The balance remaining on the gift card 125 is verified with the merchant's internal systems 135 and the transaction is completed. It is recognized that in this case all sensitive consumer account information such as actual gift card number, personal name, as well as account balance information is relayed through the POS terminal 130 (under control of the merchant 16) to the merchant's internal systems 135. This merchant gift card process is also contrary to operation of the split mobile payment system 10 whereby consumer sensitive information of gift card balance and gift card account number is transmitted directly between the payment interface 15 and the consumer device 8 over the network 11 (e.g. via network connection 1) while the representative code data 4 and product purchase information of the purchase transaction 5 is communicated between the merchant device 12 and the payment interface 15, thereby providing the advantage of restricting access by the merchant 16 to the payment account information 61 (in this case gift card account number and account balance) of the consumer 18.

Referring to FIG. 3, shown is the mobile payment system 10 for completing the purchase transaction 5 (e.g. an electronic transfer of money from one account to another based on a purchase of a specified product by the merchant 16) between the merchant 16 (e.g. an entity such as a product seller) and the consumer 18 (e.g. an entity such as a product buyer). The merchant 16 has a financial account 70 with their financial institution (part of the account processing system 2) and the consumer 18 has a financial account 72 with their financial institution (not shown), such that a payment service platform 20 coordinates settlement of the purchase transaction 5 between the financial accounts 70, 72 (as performed by a account processing system 2 such as but not limited to one or more financial institutions or transaction exchanges operating in conjunction or otherwise on behalf of the financial institutions at which the accounts 70,72 are held). For example, purchase transaction 5 can be an exchange of money (e.g. $5) as a result of goods or services changing hands between the merchant 16 and the consumer 18 (e.g. buying a bicycle at a department store). An advantage of the mobile payment system 10, as further described below, is that the merchant 16 and the consumer 18 do not have to expose their personal financial information with one another, including personal identifications numbers (PIN), financial institution account numbers and/or financial account passwords). The purchase transaction 5 can involves the use of an optical machine readable image (OMRI) 200 (also referred to generically as barcode) as the code data 4 that contains encoded account information, as further described below (i.e. the code data 4 is mapped to the stored payment account information 61 accessible by the transaction interface 15 and therefore restricted from access by the merchant 16 and/or the merchant application 14).

As described above, the code data 4 can also be represented as the short code, which is also used as an encoded version of the actual account number to which the code data 4 is associated with (i.e. the code data 4 is mapped to the stored payment account information 61 accessible by the transaction interface 15 and therefore restricted from access by the merchant 16 and/or the merchant application 14).

Referring again to FIG. 3, the merchant 16 operates a computer device 12 (having an installed payment application 13) and the consumer 18 operates a computer device 8 (having an installed payment application 13), such that computer devices 8, 12 can be in communication with one another and with a payment service platform 20 (having an installed transaction interface 15) via a communications network 11. The communications network 11 can be a one or more networks, for example such as but not limited to: the Internet; an extranet; and/or an intranet. Further, the communications network 11 can be a wired or wireless network. It is also recognized that network 11 messages (between the various devices 6, 8,12 and system 2) can be communicated via short range wireless communication protocols such as but not limited to Bluetooth™, infrared (IR), radio frequency (RF), near field communication (NFC) and/or by long range communication protocols (e.g. HTTP, HTTPS, etc.), in view of the type of electronic communication (e.g. individual network connections 0,1) used between any pair of devices 6,8,12 and system 2. For example, devices 8,12 could communicate with one another using short range Bluetooth™ communications while devices 6,8 and 6,12 could communicate with one another using long range HTTPS based communications using individual network connections 0,1.

It is recognized that network 11 communication messages facilitating the processing of the purchase transaction 5 are preferably between each of the applications 13,14 and the transaction interface 15, rather than directly between the applications 13,14 themselves (i.e. directly meaning without interaction with the transaction interface 15). Therefore, in one embodiment, in the event that the applications 13,14 need (e.g. request) information from one another, these request (and response) network 11 messages would go through the transaction interface 15 acting as an intermediary network interface between the applications 13,14 using the individual network connections 0,1 as described above. The advantage with using the transaction interface 15 as the intermediary is that the sensitive payment account information 61 of the consumer 18 is not provided to, transmitted by, or otherwise processed by the computer device 12 and/or merchant application 14 of the merchant 16. However, it is recognized that network 11 messaging directly between the applications 13,14 can also be configured, for example for the purpose of communicating the code data 4 while at the same time restricting access by the merchant 16 to the payment account information 61 of the consumer 18.

Further, the payment service platform 20 can communicate also via the communications network 11 with the account processing system 2 that performs the settlement (e.g. debit of funds specified in the purchase transaction 5 from the account 72 and crediting of the funds in to the account 70) of the purchase transaction 5 between the financial accounts 70, 72. It is recognized that the actual amount of debit and credit funds actions performed by the account processing system 2 (i.e. the funds amount specified in the purchase transaction 5 related to the product desired by the consumer 18) may not exactly match a funds amount 203 (see FIG. 5) specified in the purchase transaction 5, due to applied service charges. For example, a payment request of $5 from the financial account 72 to the financial account 70 could result in an actual debited amount of $5.02 (representing an included $0.02 service charge to the merchant 16) and/or an actual credited amount of $4.98 (representing an included $0.02 service charge to the consumer 18).

Therefore, it is anticipated that processing of the electronic purchase transaction 5 by the split mobile payment system 10 can involve a transaction service charge being charged to the merchant 16 and/or the consumer 18 in order to complete the purchase transaction 5 initiated by the merchant 16. Purchase transaction 5 settlement can be defined as where the funds amount is transferred from the one account 70 to the other account 72, i.e. the credit and debit transactions of the funds amount against the respective accounts 70,72 are either performed (e.g. in real time) or promised to be performed (e.g. included in a batch transaction to be performed later in the day or following business day).

Referring again to FIG. 3, the computer devices 8, 12 can each have their application 13,14 that operates as a client of the payment service platform 20, such that at least the payment application 13 of the computer device 12 (of the merchant 16) is registered with the transaction service 20. Registration details 17 (see FIG. 6) of the merchant 16 with the payment service platform 20 can include merchant data such as but not limited to: identification ID 80 (e.g. Mobile Subscriber Integrated Services Digital Network Number (MSISDN) as a telephone number, a unique identifier—different from the phone number—called the International Mobile Equipment Identity (IMEI), a universally unique identifier (UUID) such as a MAC address or other implemented generation scheme for the UUID) of the computer device 12; merchant ID 82 that is or is otherwise associated (mapped, linked) to the actual account number 70 of the merchant 16; and a unique encryption key 84 that is assigned to the merchant 16.

The consumer 18 can also be registered with the payment service platform 20 and have registration details 17 including one or more consumer data such as but not limited to: identification ID 80 (e.g. Mobile Subscriber Integrated Services Digital Network Number (MSISDN) as a telephone number, a unique identifier—different from the phone number—called the International Mobile Equipment Identity (IMEI), a universally unique identifier (UUID) such as a MAC address or other implemented generation scheme for the UUID) of the computer device 8; consumer ID 82 that is or is otherwise associated (mapped, linked) to the actual account number 72 of the consumer 18; and a unique encryption key 84 that is assigned to the consumer 18.

It is recognized that in view of the above, any of the registration details 17 (of the merchant 16 and/or the consumer 18) can be included in any information data associated with the purchase transaction 5 that is received by the payment service platform 20. Further, it is recognized that any of the registration details 17 (of the merchant 16 and/or the consumer 18) can be incorporated in to the OMRI 200 (that includes the code data 4 as encoded account information) used to facilitate the purchase transaction 5, as further described below.

The payment service platform 20 is implemented on the computer device 6 (e.g. a web server) and communicates over the communications network 11 with the computer devices 8,12 via a hosted transaction interface 15. The transaction interface 15 of the payment service platform 20 can be a web site accessible over the communications network 11 by the computer devices 8,12 using respective web browsers operating on the computer devices 8,12, such that the transaction interface 15 is in respective communication with the applications 13,14 of the client devices 8,12. Accordingly, the transaction interface 15, computer device 12 and computer device 8 can interact (e.g. via network 11 messages) together to initiate and complete the purchase transaction 5, for example based on products offered and sold by the merchant 16 to the consumer 18, such that the code data 4 (e.g. OMRI 200—see FIG. 5) is generated (or otherwise provided) and included as part of the initiation and/or processing of the purchase transaction 5 in conjunction with the order interface 15.

Code Data 4

As described above, the code data 4 can be represented as the short code, which is also used as an encoded version of the actual account number to which the code data 4 is associated with (i.e. the code data 4 is mapped to the stored payment account information 61 accessible by the transaction interface 15 and therefore restricted from access by the merchant 16 and/or the merchant application 14). In this embodiment, the code data 4 is implemented as a short code service, such that instead of scanning or otherwise supplying the code data 4 as the barcode 200, the consumer 18 provides a short code (e.g. a sequence of characters including numeric characters and/or alpha characters) that is also known to the Payment Service Platform 20 as the code data 4 used in identifying the actual payment account information 61 stored and accessible by the payment interface 15. Therefore, after providing the code data 4 as a series of numeric characters and/or alpha characters to the merchant application 14, the rest of the split purchase transaction 5 process is similar to using the barcode 200 also an encoded representation of the actual payment account information 61 that is restricted from access by the merchant 16. One advantage in using the short code is that it works in situations where generating or otherwise scanning/processing the barcode 200 (also referred to as ORMI) is not feasible by the merchant application 14 and/or the payment application 13. In this manner, the code data 4 is received by the merchant application 14 for subsequent incorporation into the data of the purchase transaction 5 communicated (e.g. via network connection 0) directly with the payment service platform 20 (e.g. via the transaction interface 15). In this manner, direct access to the payment account information 61 (e.g. actual financial account 72 number and/or account access password such as PIN of the consumer 18) by the merchant is restricted, as the code data 4 is used by the payment service platform 20 as a lookup identifier for accessing the actual financial account number information 61 mapped or otherwise associated with the code data 4 stored or otherwise accessible by the transaction interface 15 in a lookup table or index 63 (see FIG. 6).

Figure 5:
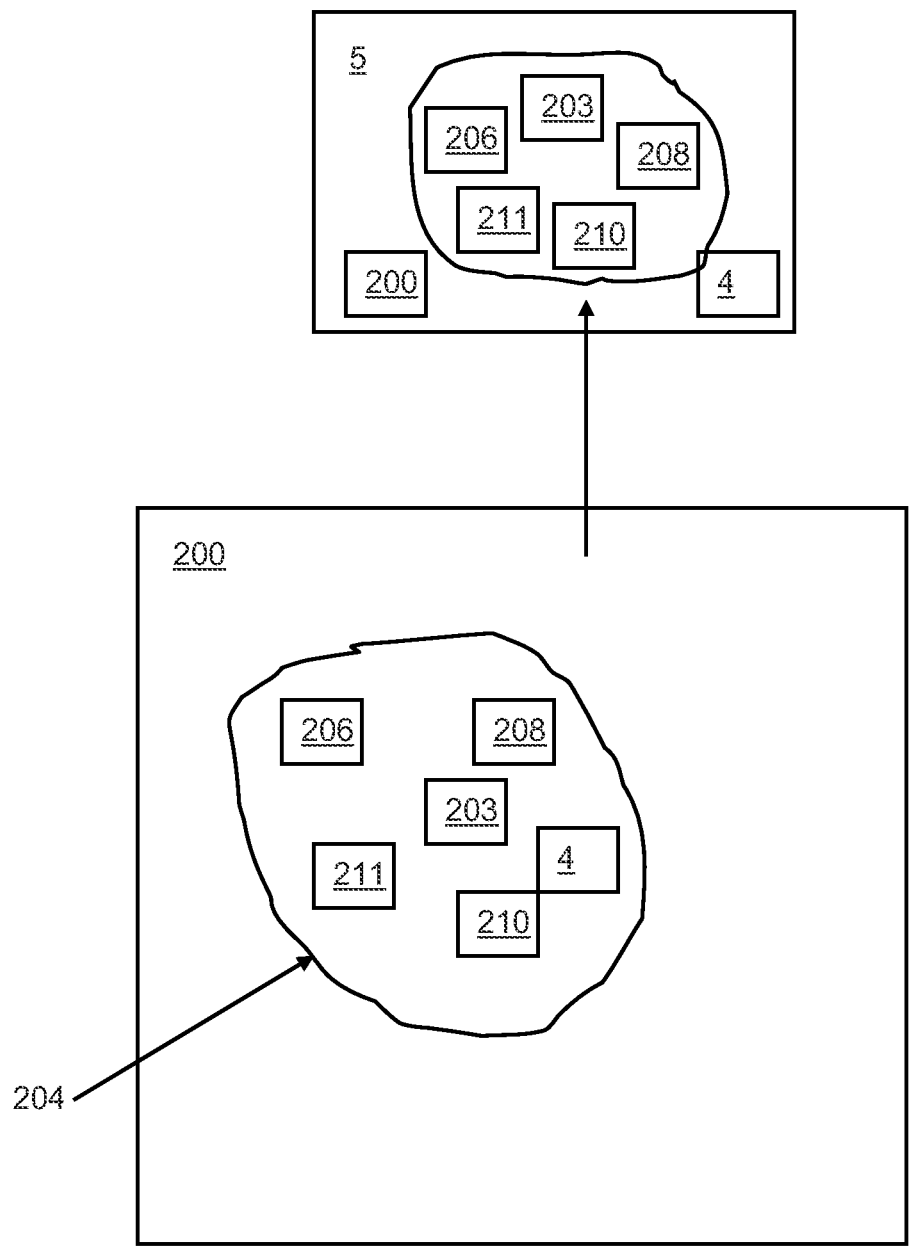
FIG. 5 shows example encoded and unencoded information for the system of FIG. 3.

Referring to FIG. 5, the OMRI 200 (i.e. an optical machine-readable representation of data) provides the code data 4 as symbology information 204 in encoded form based on a coding scheme 209. One example of the OMRI 200 is a barcode, such that the coding scheme 209 is a barcode coding scheme for use in encoding and decoding of the symbology information 204 of the barcode. Another example of the OMRI 200 is a dataglyph, such that the coding scheme 209 is a dataglyph coding scheme for use in encoding and decoding of the symbology information 204 of the dataglyph.

The OMRI 200 is used by the system 10 to represent and facilitate processing of the purchase transaction 5 by representing textual information 201 (e.g. consumer 18 identification or account 70, 72 information, a transaction number identifying the purchase transaction 5, product descriptions and/or transfer terms including password or PIN related information corresponding to the account 70 and/or the account 72, etc.) that is encoded as symbology information 204 in the OMRI 200. It is recognized that the purchase transaction 5 can be initiated by the merchant 16 representing a seller of a product (e.g. a good or service provided by the seller to the buyer) or could be initiated by the consumer 18 representing the buyer of the product in the case where the buyer makes an unsolicited offer/bid for an available product (of a potential seller).

As discussed below, the computer device 8 does not necessarily have to communicate with the computer device 12 over the communications network 11, in order to provide the OMRI 200. Instead, the consumer 18 can record or otherwise generate an image of the OMRI 200 by using an imager of the computer device 8 (e.g. a camera 118 enabled mobile device—see FIG. 7), for subsequent display by the payment application 13 and capture by the computer device 12. In this example, the user interface 104 (see FIG. 7) of the computer device 8 can display the OMRI 200 within range of the camera 118 of the computer device 12 for subsequent receipt as a recorded image. In this manner, the code data 4 encoded in the OMRI 200 is received by the merchant application 14 for subsequent incorporation into the data of the purchase transaction 5 communicated (e.g. via network connection 0) directly with the payment service platform 20 (e.g. via the transaction interface 15). In this manner, direct access to the payment account information 61 (e.g. actual financial account 72 number and/or account access password such as PIN of the consumer 18) by the merchant is restricted, as the code data 4 is used by the payment service platform 20 as an lookup identifier for accessing the actual financial account number information 61 mapped or otherwise associated with the code data 4 stored or otherwise accessible by the transaction interface 15 in a lookup table or index 63 (see FIG. 6).

Definition of Products

In economics, economic output is divided into goods and services. When an economic activity yields a valuable or useful thing, it can be known as production output of the totality of products (e.g. goods or services) in an economy that is made available for use by someone else. Products as goods can range from a simple safety pin, food, clothing, computer components to complex machinery and electronic or physical media (physical or electronic versions of music, print media, etc.). Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The entity providing the products can be a businessperson or individual engaged in wholesale/retail trade, an organization, an administration, and/or a business that sells, administers, maintains, charges for or otherwise makes available product(s) that are desirable by their customer. Accordingly, the entity providing (e.g. selling) the product can be one person, or an association of persons, for the purpose of carrying on some enterprise or business; a corporation; a firm; etc.

Further, it is recognized that the products can be related to company activities not related to specific product(s), for example customer service, community activities, donations, and/or sponsorships. These general activities of the entity providing the product are also considered as part of the definition of products. As discussed above, the exchanged funds can be as a result of payment of a debt by a debtor to a creditor, hence in this case the product is a loan of funds between the debtor and creditor. A further related example is where the exchanged funds can be as a result of loaning a sum of money (i.e. creating a debt) between the debtor and the creditor. Also as discussed above, the debtor and/or creditors can be entities embodied as individuals (e.g. a person), companies (e.g. banks), etc. Further, it is recognized that the products can include restaurant meals (and/or service), such that the purchase transaction 5 represents a meal bill and the products are individual food and/or beverage items. It is also recognized that the products can be groceries or other retail items being paid for in person by the consumer 18 at a merchant retail establishment, for example.

As further discussed, the funds amount 203 of the purchase transaction 5 is entered via the payment application 14 of the computer device 12. The payment application 13 provides the merchant 16 with the ability to select and/or specify the funds amount 203 and can also include the OMRI 200 (see FIG. 5) that contains encoded code data 4 information (in the symbology information 204) representing summary information (e.g. optional product listing/description, purchase identification information, consumer ID, selected consumer account ID or type, etc.). It is also recognized that the purchase transaction 5 can represent a plurality of products, e.g. representing funds amount 203 data for two or more products.

In any event, it is recognized that the OMRI 200 can be received by the payment application 13 of the computer device 12 to contain code data 4 (as well as any optional data such as but not limited to the funds amount data 203, consumer data 208, merchant data 211 and/or purchase data 210) of the purchase transaction 5, including transaction data used by the payment service platform 20 in order to coordinate the settlement of the purchase transaction 5 via the account processing system 2 (i.e. transferring funds from one specified account 70,72 to another specified account 70,72). It should be noted that the actual generation of the OMRI 200 can be alternatively performed by the payment service platform 20 on behalf of the payment application 13 upon request, as further described below.

OMRI 200

Referring to FIG. 5, as used herein, the term OMRI 200 (e.g. barcode, dataglyph, etc.) refers to an optical machine-readable representation of encoded information or data, presented as an ordered pattern of symbols (i.e. symbology information 204). For example, barcodes can encode information in the widths and the spacing of parallel lines, and may be referred to as linear or 1D (1 dimensional) symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, barcode images discussed herein for use with a barcode encoder or decoder can refer to either 1D or 2D barcodes. With conventional monochromatic barcodes, features are typically printed in black on a white background, thereby forming a pattern that is used to form the machine-readable representation of the code data 4 (and optionally any other information useful in the purchase transaction 5). With color barcodes, the pattern can include any number of colors (typically also including black and white) distinguishable from one another during the barcode decoding process.

The OMRI 200 is generated to include symbology information 204 representing code data 4. As discussed further below, the OMRI 200 can be electronically displayed (e.g. on a computer display), can be provided as graphic content (e.g. an image file such as but not limited to a GIF or JPEG) in a network message and/or can be provided in printed form (e.g. presented on a physical medium such as paper or plastic—for example presented on a label). As discussed, interaction between the OMRI 200 and the merchant 16 (see FIG. 3) can include merchant 16 actions such as but not limited to: selection (e.g. via mouse or other pointer) on a user interface 104 (see FIG. 7) of the computer device 8 displaying the OMRI 200; receiving an image file containing the OMRI 200; and/or recording/capturing the image of the OMRI 200 using an imager 118 (e.g. camera) of the computer device 12 (e.g. mobile device), such that the OMRI 200 is displayed on physical media and/or electronic media (i.e. an electronic display adjacent to the merchant device 12 and in-range of the imager 118). Example environments of the described image capture process would be where the OMRI 200 is displayed on the computer device 8 of the consumer 18.

In terms of the symbology information 204 of the OMRI 200, the symbology information 204 includes a plurality of symbols (i.e. graphical elements) that, as a collection of symbols or patterns (e.g. an organized collection of symbols forms a legend, or key), represents encoded funds information that is distinct from the actual unencoded textual information itself. For example, a graphical element (of the symbology 204) of a black line of a specific width represents a textual element (of the textual information) as the number six, while a different width represents a different textual element (of the textual information) such as the number two. It is recognized that graphical elements can be pictures (e.g. images) of text elements and/or of non-text elements. For example, the graphical element "6" (e.g. encoded or symbology information 204) in the coding scheme 209 could be mapped to a code data "1234" (e.g. unencoded information). In another example, the graphical element "(*)" (e.g. encoded or symbology information 204) in the coding scheme 209 could be mapped to a code data "1234" (e.g. unencoded information).

The purpose of the symbology information 204 is to communicate encoded information as readable (e.g. decodable) by an image decoder 119 or otherwise encodable by an image encoder 121. The decoder 119 could be present on the computer device 8 and/or on the payment service platform 20, as further described below. It is recognized that mapping (i.e. processing performed by the decoder 119 or encoder 121) between the symbology information 204 and the textual information is what enables the OMRI 200 to be generated and interpreted. A specification of the symbology information 204 can include the encoding of the single digits/characters of the textual code data 4 as well as the start and stop markers into individual symbols (e.g. bars) and space between the symbols of the symbol collection/pattern, the size of a quiet zone required to be before and after the OMRI 200, as well as a computation of a checksum incorporated into the OMRI 200 for error checking purposes as is known in the art.

It is recognized that the OMRI 200 may not contain descriptive data, rather the OMRI 200 can be used as reference codes (e.g. decoded information) that a computer uses to look up an associated record that contains the descriptive textual code data, as well as any other relevant information associated with the textual code data encoded in the OMRI 200. For example, the matching item record of the symbology information 204 can contain an optional description of the product, consumer and/or merchant name, funds amount, merchant or consumer financial account information lookup identifiers or designations, etc., including any of the product data 206, merchant data 208, consumer data 211 and/or purchase data 210 as further described below. However, some OMRI 200 can contain, besides reference ID, additional or supplemental information such as product name or manufacturer, for example, and some 2D OMRI 200 may contain even more information as they can be more informationally dense due the greater variation potential of the printed patterns over those of 1D OMRI 200.

In terms of different barcode type, linear symbologies (e.g. UPC barcodes as an example symbology format of the barcode) can be classified mainly by two properties, continuous vs. discrete and two-width vs. many-width. In continuous vs. discrete, characters (i.e. representing the invoice data content) in continuous symbologies usually abut, with one character ending with a space and the next beginning with a bar (e.g. light-dark patterns), or vice versa. Characters (i.e. representing the invoice data content) in discrete symbologies begin and end with bars and any intercharacter space is ignored as long as it is not wide enough to look like the code ends. In two-width vs. many-width, bars and spaces in two-width symbologies are wide or narrow, and the exact width of a wide bar has no significance as long as the symbology requirements for wide bars are adhered to (usually two to three times wider than a narrow bar). Bars and spaces in many-width symbologies are all multiples of a basic width called the module, wherein most such codes use four widths of 1, 2, 3 and 4 modules. Some linear symbologies use interleaving, such that the first character (i.e. representing the invoice data content) is encoded using black bars of varying width. The second character (i.e. representing the invoice data content) is then encoded, by varying the width of the white spaces between these bars. Thus characters (i.e. representing the invoice data content) are encoded in pairs over the same section of the barcode. Stacked symbologies repeat a given linear symbology vertically.

In terms of multidimensional symbologies (e.g. 2D, 3D, etc.), the most common among the many 2D symbologies are matrix codes, which feature square or dot-shaped modules (i.e. representing the invoice data content) arranged on a grid pattern. 2D symbologies also come in circular and other patterns and may employ steganography, thereby hiding modules within an image (for example, using DataGlyphs). Aztec Code is another type of 2D barcode.

Quick Response Codes (QRC) are another a type of matrix barcode (or two-dimensional code) providing faster readability and larger storage capacity compared to traditional UPC barcodes. The QR code (as an example symbology format of the barcode) consists of black modules arranged in a square pattern on a white background. The information encoded can be made up of four standardized kinds ("modes") of encoded data (e.g. numeric, alphanumeric, byte/binary, and/or Kanji), or by supported extensions virtually any kind of data.

It is also recognized that the symbology information 204 of the OMRI 200 can include custom graphical elements (as codified in the coding scheme 209) involving combinations of one or more graphical elements used to represent a textual element, e.g. a corporate logo is used as a collection of graphical elements (e.g. circle, square, and company name) that is mapped (e.g. decoded) by the coding scheme 209 to represent a textual element (e.g. a URL to a webpage of the company website). Alternatively, the textual element can be mapped (e.g. encoded) by the coding scheme 209 to represent the collection of graphical elements. In this example, the graphical element of a company name (the symbology information 204) is decoded by the coding scheme 209 to represent the text of the URL (the textual information). One example of barcodes containing custom graphical elements is Microsoft™ Tag barcodes.

Microsoft™ Tags as an OMRI 200 are another type of barcode, e.g. 2D barcodes, which offer more flexibility than traditional barcode formats both in the barcode design and the content behind it. Because Microsoft Tag barcodes can be linked to data stored on a server, you can deliver a more robust online experience—including entire mobile sites—and update the content any time without having to change the Microsoft Tag. So, if you link a Microsoft Tag on your business card to your résumé, it will still be valid after you get that big promotion. Microsoft Tags can be black-and-white or full-color, including custom images (e.g., a company logo). Therefore, the Microsoft Tag can have encoded data in the symbology information 204 of the Tag that includes a link (e.g. URL) or other hyperlink that references a location in memory (e.g. in a database) and/or a network address where data content is available/accessible via the encoded link. In other words, a Tag encoder would use a Tag coding scheme 209 to encode the textual link information into corresponding symbology information 204, e.g. the hyperlink to a website (the textual link information associated with or otherwise used to retrieve the code data 4) would be represented as one or more graphical elements such as a company logo or even graphical elements (the symbology information 204) picturing the product itself.

It is also recognized that the symbology information 204 of the OMRI 200 can be encrypted (e.g. using a DES algorithm). In terms of the format of the symbology information 204, codewords embedded/encoded in the symbology information 204 are typically 8 bits long. It is recognized that the code data 4 represented by the symbology information 204 in the OMRI 200 can be broken up into multiple blocks, such that each block includes a number (e.g. 255) of codewords in length.

Another example of an optical machine-readable (e.g. OMRI 200) representation of encoded information or data are DataGlyphs, which are a new technology for encoding machine readable data onto paper documents or other physical media. They encode information into a number of tiny, individual glyph elements. Each graphical (e.g. glyph) element can consist of a small 45 degree diagonal line as short as 1/100 of an inch or less, depending on the resolution of the printing and scanning that is used, for example. Each glyph element (as the symbology information 204) represents a single binary 0 or 1 (as the decoded textual information), depending on whether it slopes to the left or right. Sequences of these glyph elements (symbology information 204) can be used to encode numeric, textual or other information (unencoded information).

As an example configuration of the dataglyph symbology and coding scheme 209, the individual glyphs are grouped together on the page (or displayed electronically on a display), where they form unobtrusive, evenly textured gray areas, like half-toned pictures. One of the reasons for using diagonal glyph elements is because research has shown that the patterns that they form when massed together are not visually distracting. DataGlyph technology allows ordinary business documents to carry thousands of characters of information hidden in these unobtrusive gray patterns that can appear as backgrounds, shading patterns or conventional graphic design elements. Often, their presence will go completely unnoticed. (The entire Gettysburg Address will fit in a DataGlyph about the size of a small US postage stamp). DataGlyph areas can be printed on a document as part of its normal printing process or displayed on a screen as part of the normal image rendering process. The information to be put in the DataGlyphs is encoded as a sequence of individual glyphs, and these can be printed either directly by the encoding software (for instance, by computer laser printer) or via a conventional printing process, such as offset. The glyphs are laid down on a finely spaced rectangular grid so that the area is evenly textured. In addition, each glyph area contains an embedded synchronization lattice or "skeleton"—a repeating, fixed pattern of glyphs which marks the boundaries of the glyph area and serves as a clocking track to improve the reliability of reading. Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling. As a final step, the bytes of data are randomly dispersed across the glyph area, so that if any part of the glyph area on the paper is severely damaged, the damage to any individual block of data will be slight, and thus easy for the error correcting code to recover. Together, error correction and randomization provide very high levels of reliability, even when the glyph area is impaired by ink marks, staples and other kinds of image damage.

In view of the above description, it is recognized that OMRI 200 can be embodied as barcodes, dataglyphs or other images that contain encoded symbology information 204 that can be decoded into unencoded information (e.g. textual elements) using an appropriate coding scheme 209 that provides a mapping (e.g. rules) between the symbology information 204 to into the unencoded information (e.g. the decoding process) and the unencoded information into the symbology information 204 (e.g. the encoding process). In any event, the following description, for simplified example explanation purposes only, refers to OMRI 200 as barcodes 200. However, it is recognized that in the below description, the term barcode 200 can be interchanged with the broader meaning of OMRI 200, as desired.

Payment Application 13

Referring to FIG. 3, it is recognized that either of the payment applications 13,14 can include a plurality of barcode 200 related processing functionality, a plurality of purchase transaction 5 processing functionality and/or client confirmation 3 functionality configured for network 11 communication with a transaction interface 15 in a client-server relationship. For example, the application 13,14 can be configured as a thin client of the transaction interface 15, such that the application 13,14 is configured to interact with a barcode processing system of the transaction interface 15 via a series of web pages generated by the barcode processing system, sent via network messages and displayed on the user interface 104. Accordingly, the application 13,14 would interact with a web browser (or other network communication program) to send and receive the messages (corresponding to respective requests or associated responses for communications 3,4,5) via the network 11 containing transaction 5 specific information, i.e. to display the web pages on the user interface 104 including output data used for the communications 3,4,5 and to coordinate the entry of input data on the user interface 104 and network transmission of the input data for the communications 3,4,5.

Alternatively, the application 13,14 can be configured as a thick client of the transaction interface 15, such that the application 13,14 is provisioned with transaction and/or barcode processing functionality similar to (or at least a portion of) that functionality of the barcode processing system and/or barcode generation system of the transaction interface 15, as further described below. It is recognized that the thick client version of the application 13,14 could be configured to perform some of the transaction or barcode processing on behalf of or otherwise in substitution of any of the processing functionality of the barcode processing system and/or the barcode generation system implemented by the transaction interface 15 during processing associated with the purchase transaction 5 and/or in providing a representative OMRI 200 including the code data 4 upon request of the consumer 18 (e.g. represented in FIG. 3 as communication via network connection 1 of the code data 4. It is also recognized that the thick client version of the application 13,14 could be configured to communicate over the network 11 via a series of web pages as generated or otherwise received by the of the transaction interface 15, sent as network messages between the computer devices 8,12 and the transaction interface 15. It is recognized that the payment application 13 could communicate with the transaction interface 15 using network connection 1 and the merchant application 14 could communicate with the transaction interface 15 using network connection 0, as discussed above, thereby providing the advantage of restricting sensitive merchant 16 information from the consumer 18 (in use of network connection 0) and restricting sensitive consumer 18 information from the merchant 16 (in use of network connection 1).

Figure 4:
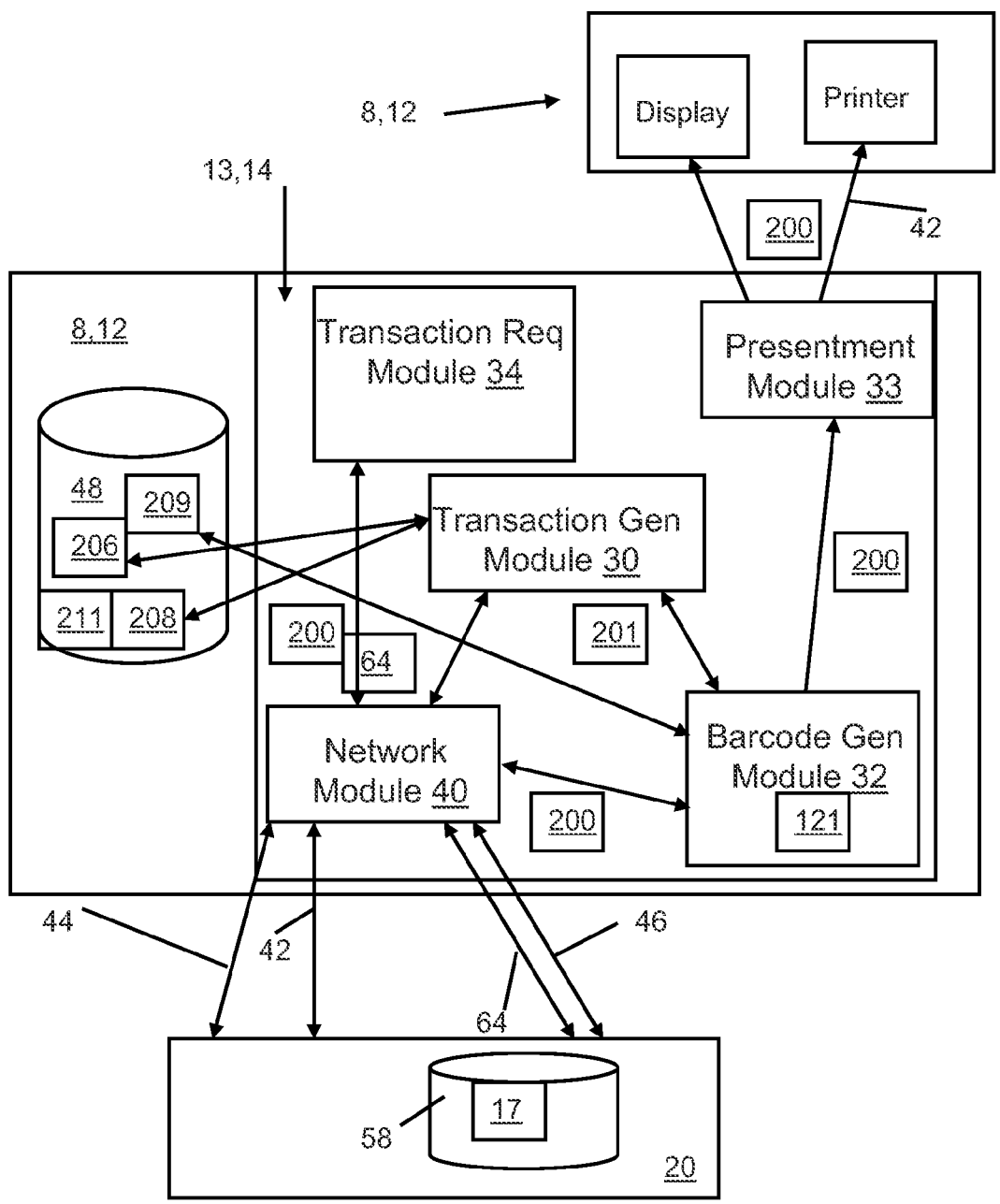
FIG. 4 is a block diagram of a payment application of the system of FIG. 3.

Referring to FIGS. 3 and 4, the application can be configured as a client application of the payment service platform 20, can be configured for generation (i.e. encoding) and presentment of the barcode 200 to the merchant 16 when operating as the payment application 13, and/or can be configured for receiving and incorporating the presented barcode 200 (including the code data 4) and generation of a purchase transaction request 64 (including the purchase transaction 5) to the payment service platform 20 when operating as the merchant application 14. The merchant application 14 is also configured to provide a graphical interface (on the user interface 104—see FIG. 7), for example, to facilitate entry of merchant account information by the merchant 16 as well as entry of the funds amount 203 requested (e.g. via a transaction generation module 30). The payment application 13 is configured to provide a graphical interface, for example, to facilitate entry of consumer account information (e.g. as code data 4, as PIN data in confirmation communication 3, etc.) by the consumer 18 as well as entry of a confirmation message 3 that the funds amount 203 is correct. It is recognized that the functionality of the application 13,14, encountered by a user during the purchase transaction 5, is dependent upon which side the computer device 8,12 is being utilized for, i.e. either the merchant 16 or the consumer 18.

Referring to FIG. 4, shown is an example configuration of the application 13,14 that can include a network communications module 40 for communicating (e.g. sending or receiving) request messages 42 with the computer device 6 and for communicating (e.g. sending or receiving) response messages 44 with the computer device 6 over the communications network 11. The network communications module 40 is also configured for sending a transaction request 64 (e.g. a request by the merchant 16 containing the appropriate purchase transaction 5 (e.g. funds amount 203, code data 4, as well as any product and merchant identification information), to allow to the payment service platform 20 to coordinate the actual funds transfer between accounts 70,72) as well as receiving confirmation messages 46 from the payment service platform 20 (containing information indicating that the appropriate account 70,72 has been credited or debited as the case warrants).

The confirmation message(s) 46 received by the merchant application 14 could contain details of the payment processing including that the appropriate account was (or will be) credited/debited by the funds amount 203 of the purchase transaction 5, as well as any transfer data 210 (see FIG. 5) identifying the purchase transaction 5 (e.g. transfer ID, merchant and/or consumer ID, description of the products, etc.) for merchant 16 accounting records. It is recognized that the payment application 13 would could also receive confirmation message(s) 46 containing details of the payment processing including that the consumer account was (or will be) debited by the funds amount 203 of the purchase transaction 5, as well as any transfer data 210 identifying the purchase transaction 5 (e.g. transfer ID, merchant and/or consumer ID, description of the products, etc.) for consumer 18 accounting records.

The network communications module 40 can also be configured to send and receive the confirmation messages 46 over the communications network 11 with respect to the payment service platform 20. Also included is a database 48 containing any optional product data 206 (e.g. product descriptions, product availability, etc.), merchant data 208 (e.g. merchant bank account number, a unique merchant reference ID of the merchant assigned by the payment service platform 20 (e.g. via the registration module 60—see FIG. 6), tax or merchant business registration details, and registration details 17 of the merchant), consumer data 211 (e.g. consumer bank account number, a unique consumer reference ID of the consumer assigned by the payment service platform 20 (e.g. via the registration module 60—see FIG. 6), tax or consumer business registration details, and registration details 17 of the consumer) and network 11 address information of the payment service platform 20. It is recognized that preferably the merchant application 13 of the merchant 16 does not have access to sensitive consumer data 211 (e.g. consumer PIN numbers and/or actual bank account numbers) and preferably the payment application 13 of the consumer 18 does not have access to sensitive merchant data 208 (e.g. merchant PIN numbers and/or actual bank account numbers).

The database 48 can also have customized barcode definitions of a customized coding scheme 209 containing relationships (e.g. rules) between machine readable symbology and codewords used to encode (or decode) code data 4 of the purchase transaction 5 information during generation of the barcode 200 used to represent the sensitive account information 61. For example, the customized coding scheme 209 can be used to encode (i.e. translate) text based code data 4 (see FIG. 5) of the purchase transaction 5 into symbology information 204, performed during generation of the barcode 200 (e.g. by the computer device 8 and/or the payment service platform 20). The customized coding scheme 209 can also be used to decode (i.e. interpret) symbology information 204 present in the barcode 200 into text based code data 4 during processing of the barcode 200

(e.g. by the computer device 8 and/or the payment service platform 20). It is recognized that the customized coding scheme 209 can be known to the payment service platform 20 and can include customized codewords pertaining to specific code data 4 such as but not limited to: registration details 17 of the consumer, consumer ID, etc.

Referring again to FIG. 4, the payment application 13 also has a transaction generation module 30 used to collect the purchase transaction 5 data (e.g. product data 206, merchant data 208, consumer data 211, code data 4 and/or transfer data 210) associated with the funds amount 203 selected/entered by the merchant 16 during initiation of the purchase transaction 5. It is recognized that optional product data 206 and some of the consumer data 211 of the purchase transaction 5, such as specific products ordered and quantity of each product, could be provided to the transaction generation module 30. Further, the transaction generation module 30 would collect (or otherwise receive) the merchant data 208 for the purchase transaction 5 from the database 48. The transaction generation module 30 also generates the purchase transaction 5 data including the funds amount 203 (optionally including applicable taxes) that includes the total funds amount owed (for example) by the consumer 18 and merchant identification information (associated with or otherwise embodying the merchant bank account information) of the purchase transaction 5. For example, in terms of the merchant bank account information, this could be supplied as part of the merchant information included in the purchase transaction 5 data or this could be supplied as a merchant identification information (e.g. merchant ID) used by the payment service platform 20 to lookup the actual merchant bank account information known to the payment service platform 20 (e.g. via the registration module 60—see FIG. 6) and therefore abstracted from the consumer 18.

It is recognized that the network module 40 could also be configured to provide to the user of the computer device 8 (via a presented graphical user interface on the user interface 104 of the computer device 8) the ability to select or otherwise enter the desired consumer account 72 (e.g. specifying a credit card number, a debit card number, or any other account information for use in accepting/paying or otherwise confirming the funds amount 203) or for use during the generation of the code data 4 and/or barcode 200 as specific to the desired consumer account selected (i.e. the code data 4 and/or the barcode 200 is specific to the consumer account selected by the consumer). The network module 40 could also provide, via the graphical user interface, the ability of the consumer 18 to enter their PIN (or other password information specific to accessing their financial accounts directly) associated with the specified consumer account, thereby indicating that the user of the computer device 8 at the time of generating the code data 4 and/or resultant barcode 200 has the authority to authorize the payment service platform 20 (e.g. via the transfer processing module 65) to coordinate funds transfer involving the specified consumer account. The PIN, or other password information specific to accessing the selected financial accounts directly, can be considered as part of the code data 4 and/or barcode 200 included in the purchase transaction 5 data (e.g. included in the symbology information 204 if presented in the barcode 200) and/or as part of the confirmation messages 3,46. For example, the PIN or other password information could not be the actual PIN or password information made available to the financial institutions of the accounts 70,72, rather could be a lookup identifier information used by the payment service platform 20 (e.g. via the registration module 60) to look up the actual PIN or password information 61 stored in the registration details 17 of the consumer 18 using the reference PIN or password provided by the consumer 18 during generation of the code data 4 encoded in the barcode 200 and/or provided as unencoded textual information to the merchant application 14.

This use of PIN or password information is advantageous, in addition to any passwords required to access the computer device 8 in general (e.g. device login) and/or login to the payment application 13 specifically, as the owner of the computer device 8 would not want any unauthorized access to their financial accounts to occur. It is also envisioned that the entered PIN or password information could be done by the user in order to login to the payment application 13 itself (i.e. access the functionality of the payment application 13 provisioned on the computer device 8). It is also recognized that the user of the computer device 8 may wish to have separate PINs or passwords associated with each account accessible through the payment application 13 itself (e.g. selectable) and/or known to the payment service platform 20 (e.g. via the registration module 60) via the registration details 17, in addition to a general login (including password) to the computer device 8 and/or payment application 13 in general.

The payment application 13 can also have a barcode generation module 32, including an encoder 121, that is configured to use the available/collected code data 4 and the customized coding scheme 209 to generate the barcode 200. It is recognized that the barcode 200 can be generated by the barcode generation module 32 to contain the code data 4 entered/selected by the consumer 18, used by the payment service platform 20 to coordinate settlement of the financial transaction (associated with the purchase transaction 5 data) via the accounting processing system 2 in transferring funds from the specified account of the consumer 18 to the specified account of the merchant 16. In this example, it is envisioned that the consumer 18 is preregistered (i.e. has provided the registration details 17) with the transaction service 20 and is provided with a consumer ID (e.g. via the registration module 60) that is associated with the consumer's actual account information (and any other sensitive consumer information 61), both of which are stored in the lookup table 63 in a secure database 58 of the payment service platform 20 (thereby providing for the lookup by the registration module 60).

It is also recognized that the barcode generation module 32 could be used to restrict access of the sensitive consumer account information 61 by the merchant 16 by encoding the actual payment account numbers 72 comprising textual information (and any associated passwords and/or PIN data) as symbology information 204 using the customized coding scheme 209. In this embodiment, the consumer 18 would supply the actual financial account numbers and/or authorization information (e.g. PIN) to the barcode generation module 32, which would encode the number(s) and/or authorization information in the symbology information 204 of the generated barcode 200, for subsequent presentment to the merchant application 14 and incorporation into the purchase transaction 5 data supplied to the payment service platform 20 via the merchant application 14. In this example, the payment service platform 20 would not need to use the lookup table 63 to access the financial account information 61 of the consumer 18, rather would simply need to decode the symbology information 204 of the barcode 200 in order to gain access to the financial account information 61 for subsequent transmission to the account processing system 2 for effecting the funds transfer of the funds amount 203 from the account 72 (as identified and/or authorized by the obtained financial account information 61) to the merchant account 70.

Accordingly, it recognized that restricted access to the financial account information 61 can be provided in the split mobile payment system 10 by: sending code data 4 as textual information representative of the sensitive financial account information 61 (for subsequent use in the lookup table); sending code data 4 as encoded symbology information 204 in a generated barcode 200 that is representative of the sensitive financial account information 61 (for subsequent decoding by the payment service platform 20 and use in the lookup table); and/or sending sensitive financial account information 61 as encoded symbology information 204 in a generated barcode 200 that is the actual (i.e. not embodied as a lookup identifier) financial account information 61 (for subsequent decoding and access by the payment service platform 20).

Encoding

One example of the customized coding interpretation scheme 209 for barcodes is a modified UPC (Universal Product Code) to include code data 4 and/or sensitive financial account number information 61 specific data. Another example is a modified QR scheme, as further described below. The numbers and/or letters (e.g. ASCII— American Standard Code for Information Interchange) stored in the symbology information 204 of the barcode 200 are unique identifiers representing the particular standard code and custom code (representing purchase transaction 5 specific data) defined in the customized coding scheme 209 that, when read by the barcode decoder 119 or encoder 121, can be used to look up additional information about the item associated with the barcode 200.

Accordingly, the barcode generation module 32 takes the code data 4 and/or the sensitive financial account number information 61 (i.e. as the textual funds information) and uses the codes and associated rules of the customized coding interpretation scheme 209 to convert a piece of the textual funds information (for example, a letter, word, phrase, etc.) of the code data 4 and/or the sensitive financial account number information 61 into another form or representation (one sign into another sign), not necessarily of the same type, i.e. the symbology information 204. In information processing performed by the barcode generation module 32, encoding is the process by which textual funds information of the code data 4 and/or the sensitive financial account number information 61 is converted into symbols (of the symbol format 204 defined by the customized coding scheme 209) to be communicated/presented. Decoding is the reverse process, converting these code symbols 204 back into textual funds information understandable by a receiver. Therefore, the symbology information 204 generated from the textual funds information of the code data 4 and/or the sensitive financial account number information 61 is used by the barcode generation module 32 to construct the barcode 200, according to the customized coding scheme 209. This barcode 200 can be made available to the network communications module 40 to be sent in the request message 42 (delivered as an image file for example) to the computer device 12 or can be displayed on a browser screen of the user interface 104 of the computer device 8. It is recognized that the barcode 200 represents symbolically the textual data of the code data 4 and/or the sensitive financial account number information 61.

Referring again to FIG. 4, the payment application 13 also has a barcode presentment module 33, used by the consumer 18 to transmit via request messages 42 and/or electronically display the image of the barcode 200 to the merchant 16 on the display (of the user interface 104) of the computer device 8. Therefore, in addition to using the request messages 42, the barcode presentment module 33 can be configured to provide instructions to a printer for physically printing the barcode 200 and/or can be configured to provide instructions to the electronic display for displaying the barcode 200. In either case, the barcode presentment module 33 is configured to present the barcode 200 to the merchant 16 for subsequent receipt or image capture (of the barcode 200) using the computer device 12 (e.g. mobile device).

Referring to FIG. 4, the payment application 14 also has a transaction request module 34 used to generate the account information of the merchant 16 as well as any other relevant responder data (e.g. product data, barcode 200, code data 4), and to generate the purchase transaction 5 and send in the transfer request 64 directed to the payment service platform 20.

One embodiment, to provide for the sensitive portions of the symbology information 204 to remain undecoded, is where the merchant application 14 of the computer device 12 does not have access to the encryption key used by the encoder 121 of the payment application 13 of the computer device 8. Further, in this example, it is recognized that in the event where the payment service platform 20 does receive encoded symbology information 204 in the transaction request 64, the payment service platform 20 (e.g. via the registration module 60) would have access to the consumer 18 encryption key via their respective registration details 17 stored in the database 58.

In cryptography, the encryption key can be defined as a piece of information (a parameter) that determines the functional output of a cryptographic algorithm or cipher (i.e. as implemented by the encoder 121 or decoder 119). Without the key, the algorithm of the encoder 121 or decoder 119 would produce no useful result (i.e. the decoded symbology information 204 would be meaningless). In encryption, the key specifies the particular transformation of plaintext into ciphertext, or vice versa during decryption. Keys can be used in cryptographic algorithms, such as digital signature schemes and message authentication codes.

Further, the transaction request module 34 could also be configured to provide to the user of the computer device 12 (via a presented graphical user interface on the user interface 104 of the computer device 12) the ability to select or otherwise enter the desired merchant account (e.g. specifying a credit card number, a debit card number, or any other account information for use in accepting the funds amount 203). The transaction request module 34 could also provide, via the graphical user interface, the ability of the merchant 16 to enter their PIN (or other password information specific to accessing their financial accounts directly) associated with the specified merchant account, thereby indicating that the user of the computer device 12 at the time of generating the transaction request 64 has the authority to authorize the payment service platform 20 (e.g. via the transaction processing module 65) to coordinate funds transfer involving the specified merchant account. The PIN, or other password information specific to accessing the selected financial accounts directly, can be considered as part of the merchant data included in transaction request 64 data 5, either directly or otherwise abstracted during generation of the transaction request 64. For example, the PIN or other password information would not be the actual PIN or password information made available to the financial institutions of the accounts 70,72, rather would be reference information used by the payment service platform 20 (e.g. via the registration module 60) to look up the actual PIN or password information stored in the registration details 17 of the merchant 16 using the reference PIN or password information provided by the merchant 16 during generation of the purchase transaction 5 and its submission in the transaction request 64.

This use of PIN or password information is advantageous, in addition to any passwords required to access the computer device 12 in general (e.g. device login) and/or login to the merchant application 14 specifically, as the owner of the computer device 12 would not want any unauthorized access to their financial accounts to occur. It is also envisioned that the entered PIN or password information could be done by the user in order to login to the merchant application 14 itself (i.e. access the functionality of the merchant application 14 provisioned on the computer device 12). It is also recognized that the user of the computer device 12 may wish to have separate PINs or passwords associated with each account accessible through the merchant application 14 itself (e.g. selectable) and/or known to the payment service platform 20 (e.g. via the registration module 60) via the registration details 17, in addition to a general login (including password) to the computer device 12 and/or merchant application 14 in general.

Decoding

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 119, can be used to look up additional information about the encoded items in the barcode 200. The decoder 119 circuitry and/or software is used to recognize and/or to make sense of the symbology information 204 that make up barcode 200. The decoder 119 can translates symbols 204 into corresponding digital output in a traditional data format (i.e. as textual funds information). In order to decode the information in barcode 200, for example for 1D barcodes, the widths of the bars and spaces are recognized via edge detection and their widths measured.

Payment Service Platform 20 and Transaction Interface 15

Figure 6:
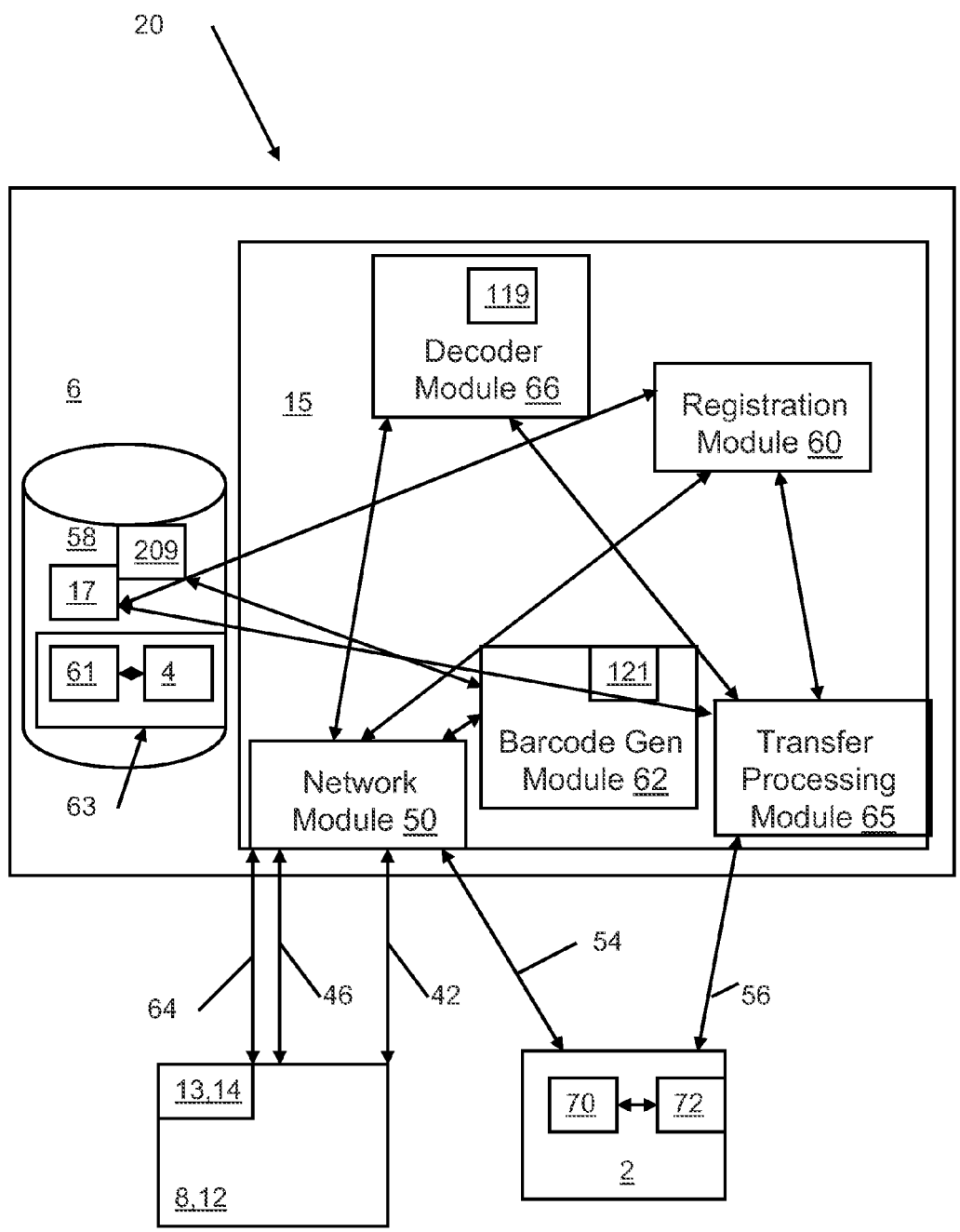
FIG. 6 is a block diagram of an example transaction service for coordinating the funds transfer via the payment application of FIG. 4.

Referring to FIG. 6, shown is an example configuration of the payment service platform 20 including the computer device 6 (e.g. a web server) hosting the transaction interface 15. The transaction interface 15 can include a network communications module 50 for receiving order request messages 52 (e.g. providing textual information and expecting a barcode 200) from the computer device 12 and for sending account processing messages 54 to the account processing system 2 over the communications network 11.

The network communications module 50 can also be configured to send and receive confirmation messages 46 to the computer devices 8,12 (in response to the received request messages 64) over the communications network 11 with respect to the computer devices 8,12. Also included is a database 58 containing registration details 17 of merchant 16 and/or consumer 18 as discussed above, and network 11 address information of the account processing system 2. The database 58 can also have customized barcode definitions of the customized coding scheme 209 containing relationships (e.g. rules) between machine readable symbology and codewords used to encode (or decode) fund information during encoding and/or decoding of symbology information 204 of the barcode 200 used in the purchase transaction 5. Further, the database 58 also has stored the lookup table 63 containing the respective code data 4 mapped to respective sensitive financial account information 61 of the consumer 18, such that any received code data 4 in the purchase transaction 5 is used by the transaction processing module 65 to access the sensitive financial account information 61 of the consumer 18 stored in the table 63 using the received code data 4 as the lookup identifier.

For example, the customized coding scheme 209 can be used by the barcode generation module 62 to encode (i.e. translate) text based code data 4 and/or sensitive financial account information 61 of the consumer 18 into symbology information 204, performed during generation of the barcode 200 for sending to the payment application 13. The customized coding scheme 209 can also be used to decode (i.e. interpret) symbology information 204 present in the barcode 200 into text based code data 4 and/or sensitive financial account information 61 of the consumer 18 received in the purchase transaction 5 during processing of the barcode 200. It is recognized that the customized coding scheme 209 is known to the payment service platform 20 and can include customized codewords pertaining to specific code data 4 and/or sensitive financial account information 61 of the consumer 18.

Referring again to FIG. 6, the transaction interface 15 also has a registration module 60 used to collect the registration details 17 during registration of the merchant 16 and/or the consumer 18. Further to that discussed above, it is recognized that the registration details 17 can include PIN data and/or password data used to access the specified account(s) 70,72 through the financial institutions of the account processing system 2. For example, in terms of the merchant or consumer bank account information, this could be supplied as part of the reference account information included in the transaction request 64, for example used by the registration module 60 to lookup the actual merchant or consumer bank account information in the registration details 17 known only to the payment service platform 20, and therefore abstracted from the appropriate merchant or consumer.

The transaction interface 15 can also have the barcode generation module 62 that is configured, by an encoder 121, to use the customized coding scheme 209 to generate the barcode 200, for subsequent delivery to the computer device 8. It is recognized that the barcode 200 is generated by the barcode generation module 62 to contain code data 4 and/or sensitive financial account information 61 of the consumer 18 needed by the account transaction processing system 2 to settle the financial transaction by transferring funds between specified accounts 70,72.

Encoding

One example of the customized coding interpretation scheme 209 for barcodes is a modified UPC (Universal Product Code) to include account specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing account specific data) defined in the customized coding scheme 209 that, when read by a barcode decoder 119, can be used to look up additional information about the account item associated with the barcode 200.

Accordingly, the barcode generation module 62 takes the code data 4 and/or sensitive financial account information 61 of the consumer 18 and uses the codes and associated rules of the customized coding interpretation scheme 209 to convert a piece of the textual account information (for example, a letter, word, phrase, etc.) into another form or representation (one sign into another sign), not necessarily of the same type, i.e. the symbology information 204. In information processing performed by the barcode generation module 62, encoding is the process by which textual account information is converted into symbols (of the symbol format 204 defined by the customized coding scheme 209) to be communicated. Decoding is the reverse process, converting these code symbols 204 back into textual account information understandable by a receiver. Therefore, the symbology information 204 generated from the textual account information is used by the barcode generation module 62 to construct the barcode 200, according to the customized coding scheme 209. This barcode 200 is made available to the network communications module 50 to be sent in the message 54 (for example) to the computer device 8 (e.g. displayed on a browser screen of the user interface 104 of the computer device 8 or otherwise delivered as an image file in the network message 54, etc.). It is recognized that the barcode 200 represents symbolically the textual account data.

Referring to FIG. 6, the transaction interface 15 can also have a decoder module 66, including the decoder 119, used to decode the received barcode 200 in the case where the transaction request 64 data includes symbology information 204. For example, the decoder 119 could be used to decode account information of the consumer 18 (pertaining to the selected mode of payment/credit of the consumer 18 and optionally including the PIN or password data of the consumer account) as well as any other relevant consumer data from the symbology 204, for example using the respective encryption key stored in the registration details 17 of the consumer 18). One embodiment, to provide for the sensitive portions of the symbology information 204 to be decoded, is where the decoder 119 of the computer device 6 has access to the encryption key (via the registration details 17) used by the encoder 121 used by the payment application 13 of the computer device 8. It is also envisioned that the decoder 119 can have access to the encryption key used by the payment application 13 of the computer device 8. Therefore, in the event where the payment service platform 20 does receive encoded symbology information 204 in the transaction request 64, the payment service platform 20 would have access to the consumer encryption key via their respective registration details 17 stored in the database 58.

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 119, can be used to look up additional information about the account information item associated with the barcode 200. The decoder 119 circuitry and/or software is used to recognize and/or to make sense of the symbology information 204 that make up barcode 200. The decoder 119 can translates symbols 204 into corresponding digital output in a traditional data format (i.e. as textual account information). In order to decode the information in barcode 200, for example for 1D barcodes, the widths of the bars and spaces are recognized via edge detection and their widths measured.

Referring again to FIG. 6, once all of the textual account information is received by the transaction interface 15 or otherwise decoded, a transfer processing module 65 communicates using processing messages 56 with the account processing system 2. It is recognized that the processing messages 56 could include decoded account data (e.g. textual account information) obtained directly from the symbology information 204 of the barcode 200, and/or as received from the lookup process using decoded code data 4 in the table 63.

Further, the transfer processing module 65 could be configured to confirm whether the received PIN or password information of the merchant and/or the consumer matches the corresponding PIN or password information stored in their respective registration details 17 that is associated with their respective account (e.g. credit card number, a debit card number, or any other account information for use in accepting/paying the funds amount 203). In the event that the received PIN or password information (for the merchant and/or the consumer) matches the corresponding PIN or password information stored in their respective registration details 17, the transfer processing module 65 has confirmed that the respective merchant 16 and/or the respective consumer 18 had the authority to authorize the payment service platform 20 to coordinate funds transfer involving the specified financial account(s). In the event that the received PIN or password information (for the merchant and/or the consumer) does not match the corresponding PIN or password information stored in their respective registration details 17, the transfer processing module 65 could deny the transaction request 64 and send notice of the denial back to the computer devices 8,12 via the respective transaction confirmation messages 46. For example, if both matches fail, then both of the computer devices 8,12 would be notified of the denial. Otherwise if only one of matches failed, then the respective one of the computer devices 8,12 would be notified of the denial.

In any event, the transfer processing module 65 is also configured to receive confirmation message(s) 56 from the account processing system 2, such that confirmation message(s) 56 include a confirmation that the funds amount has either been transferred between accounts 70,72 or declined. The confirmation message(s) 56 sent by the payment service platform 20 can include instructions to the respective financial institutions (not shown), for example, associated with the customer and merchant account information to debit the appropriate account 70,72 and credit the appropriate account 70,72 by the funds amount 203 along with the required account data and (optional) PIN or password data. The confirmation message(s) 56 received by the transaction interface 15 from the account processing system 2 could contain details of the payment processing including that the accounts were (or will be) credited by the amount, as well as any transfer data 210 (e.g. transfer ID) for accounting records.

In is recognized in the above embodiments, that in terms of the account information, this could be supplied as specifically the account number or this could be supplied as identification information (e.g. account ID) used by the payment service platform 20 to lookup the actual bank account information known to the payment service platform 20 (via the respective registration details 17) and therefore the account number would be abstracted from the general communications over the network 11.

Computer Device 8,12

Figure 7:
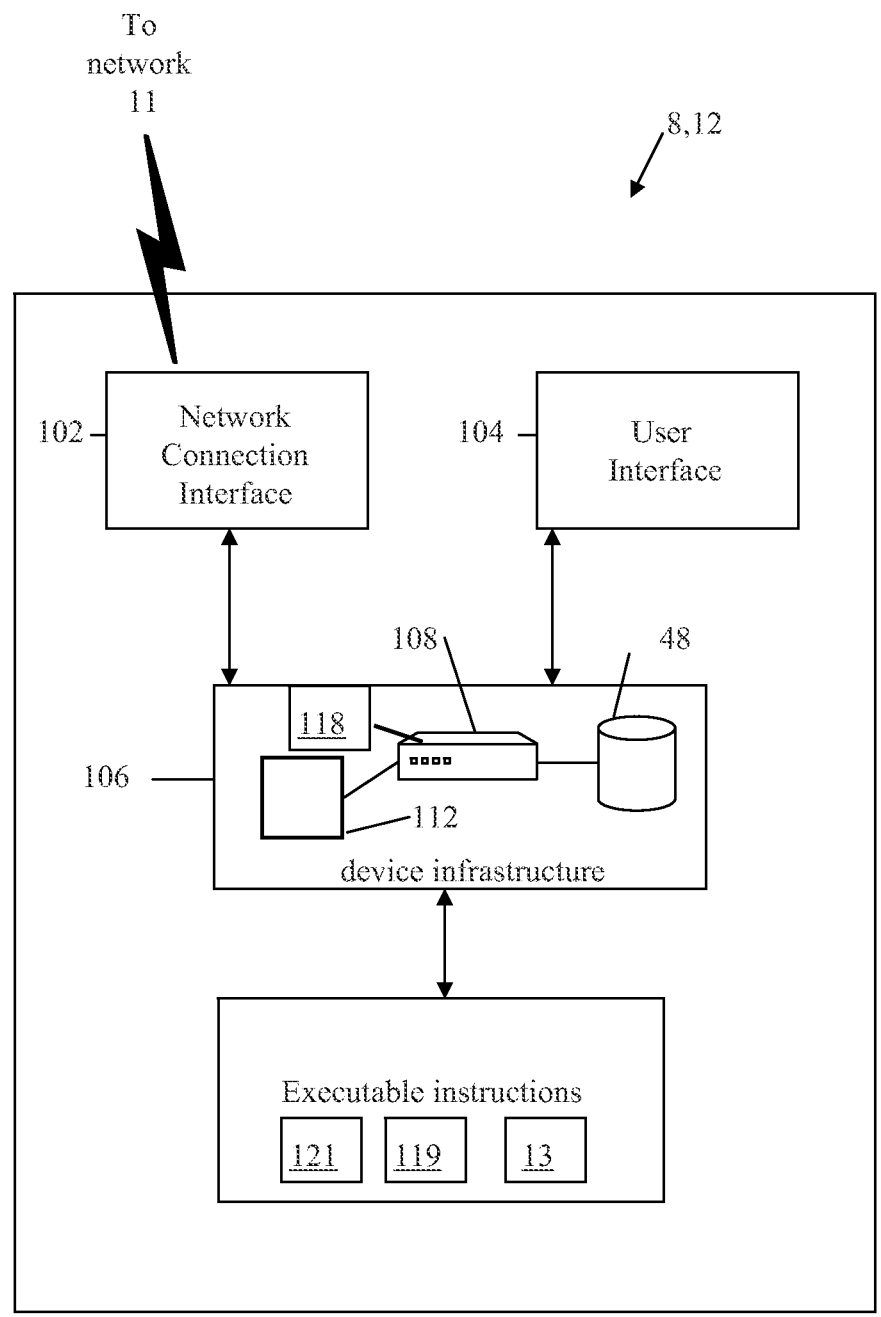
FIG. 7 is a block diagram of a computer device implementing the payment application of FIG. 3.

Referring to FIG. 7, each computer device 8,12 can be a wireless-enabled (e.g. WiFi, WAN, etc.) personal data assistant, or email-enabled wireless telephone, or a desktop computer terminal. In addition, the wireless communications are not limited to only facilitating transmission of text data (e.g. encrypted) and can therefore be used to transmit image data, audio data or multimedia data, for example, as desired.

As shown in FIG. 7, the computer device 8,12 comprises a communication network interface 102, a user interface 104, and a data processing system 106 in communication with the network interface 102 and the user interface 104. The network interface 102 can include one or more antennas for wireless communication over the communications network 11. Preferably, the user interface 104 comprises a data entry device (such as keyboard, microphone or writing tablet), and a display device (such as an LCD display). The display screen of the user interface 104 can be used to visually present a graphical user interface (GUI) of the application 13,14 to the user, including results of the barcode 200 image capture process and processing. The display screen can employ a touch screen display, in which case the user can manipulate (i.e. enter and/or modify/delete) account and purchase transaction 5 information (e.g. product data 206, requestor data 208, responder data 211 and/or transfer data 210) in order to generate the transaction request 64.

The data processing system 106 includes a central processing unit (CPU) 108, otherwise referred to as a computer processor, and a non-volatile memory storage device (e.g. DISC) 48 (such as a magnetic disc memory or electronic memory) and a read/write memory (RAM) 112 both in communication with the CPU 108. The memory 48 includes data which, when loaded into the RAM, comprise processor instructions for the CPU 108 which define memory objects for allowing the computer devices 8, 12 to communicate with one another and the payment service platform 20 (for accessing the transaction interface 15) and the account processing system 2 (e.g. one or more processing servers) over the communications network 11. The mobile device 8,12, and the processor instructions for the CPU 108 will be discussed in greater detail below.

The CPU 108 is configured for execution of the application 13,14 for facilitating communication with the payment service platform 20, the computer device 8, 12 and the computer device 6. For example, it is recognised that the application 13,14 is used to coordinate, as implemented by the CPU 108, the generation, receipt, and processing of the barcode 200 and the transaction messages 64. For example, the payment application 13 can operate the imager 118 and the encoder/decoder 119,121.

The CPU 108 facilitates performance of the computer device 8,12 configured for the intended task (e.g. of the respective module(s) of the application 13,14) through operation of the network interface 102, the user interface 104 and other application programs/hardware (e.g. web browser made available to the application 13,14) of the computer device 8, 12 by executing task related instructions. These task related instructions can be provided by an operating system, and/or software applications located in memory, and/or by operability that is configured into the electronic/digital circuitry of the processor(s) 108 designed to perform the specific task(s), including operation of the modules 30,32,33,34,40. Further, it is recognized that the device infrastructure 106 can include a computer readable storage medium 48 coupled to the processor 108 for providing instructions to the processor 108 and/or to load/update the instructions. The computer readable medium 48 can include hardware and/or software such as, by way of example only, memory cards such as flash memory or other solid-state memory.

Further, it is recognized that the computer device 8, 12 can include the executable applications comprising code or machine readable instructions for implementing predetermined functions/operations including those of an operating system, the imager 118, the decoder 119, the encoder 121 and the application 13, 14 for example. The processor 108 as used herein is a configured device and/or set of machine-readable instructions for performing operations as described by example above, including those operations as performed by any or all of the imager 118, the decoder 119, the encoder 121 and the application 13,14. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

The data processing system 106 can include the imager 118 (e.g. a camera including an image sensor—e.g. CCD or CMOS sensor) suitable for capturing images of the barcode 200 displayed or otherwise presented to the merchant 16 within range of the imager 118. The application 13,14 is configured to control the operation of the imager 118 to capture the image of the barcode 200. The storage 48 can also contain the customized coding interpretation scheme 209 for use in decoding/encoding the barcode 200.

Transaction Service Device 6

Figure 8:
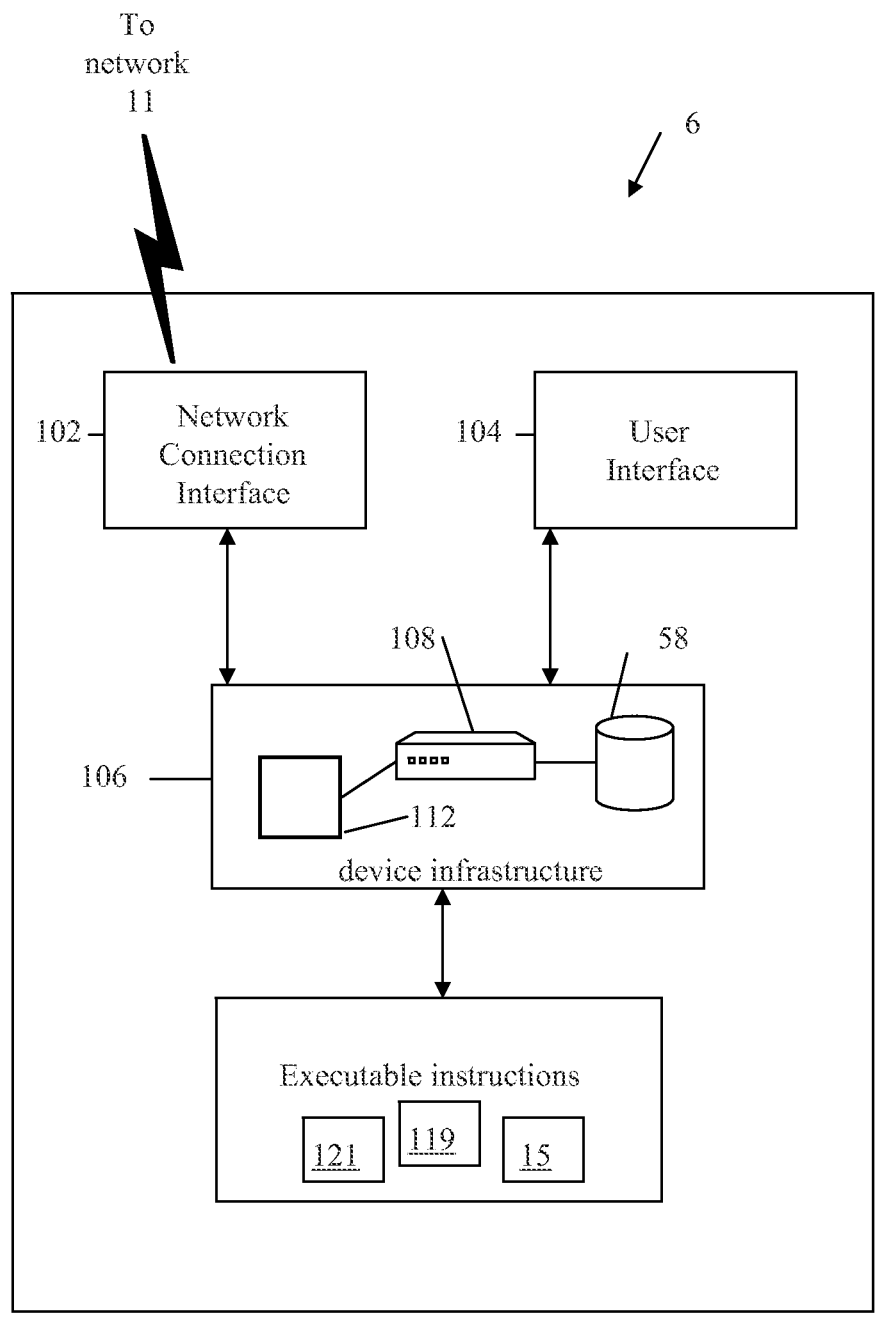
FIG. 8 is a block diagram of a computer device implementing the transaction service of FIG. 6.

Referring to FIG. 8, the device 6 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. Preferably, the device 6 is a network server.

As shown in FIG. 8, the device 6 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 58 (such as a magnetic disc memory or electronic memory) and a read/write memory (RAM) 112 both in communication with the CPU 108. The memory 58 includes data which, when loaded into the RAM, comprise processor instructions for the CPU 108 which define memory objects for allowing the device 6 to communicate with the computer devices 8,12 and the account processing system 2 (e.g. one or more processing servers) over the communications network 11. The instructions can be used to provide or otherwise host the transaction interface 15 as a website running on the computer device 6 and accessed via the network 11.

The CPU 108 is configured for execution of the transaction interface 15 for facilitating communication with the account processing system 14 and the computer devices 8,12. For example, it is recognised that the transaction interface 15 is used to coordinate, as implemented by the CPU 108, the generation, receipt, and processing of the textual account information and the symbology information 204 of the barcode 200, as well as coordinating the settlement of funds transfer of the funds amount 203 between the specified accounts 70,72.

The CPU 108 facilitates performance of the device 6 configured for the intended task (e.g. of the respective module(s) of the transaction interface 15) through operation of the network interface 102, the user interface 104 and other application programs/hardware (e.g. web service made available through the transaction interface 15) of the device 6 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 58 coupled to the processor 108 for providing instructions to the processor 108 and/or to load/update the instructions. The computer readable medium 58 can include hardware and/or software such as, by way of example only, memory cards such as flash memory or other solid-state memory. The storage 58 can also contain the customized coding interpretation scheme 209 for use in encoding and/or decoding the barcode 200.

Further, it is recognized that the device 6 can include the executable applications comprising code or machine readable instructions for implementing predetermined functions/operations including those of an operating system and the modules 50,60,62,63,65,66 for example. The processor 108 as used herein is a configured device and/or set of machine-readable instructions for performing operations as described by example above, including those operations as performed by any or all of the modules 50,60,62,63,65, 66. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

Example Operation of the System 10

The disclosed split mobile payment system 10 provides for the Consumer 18 to use his/her Mobile Device 8 to facilitate a financial transaction at a merchant Terminal 12 through the use of the payment application 13 running on such Mobile Device 8 that allows the Consumer 18 to provide a Payment Account Identifier (e.g. code data 4 and/or a generated barcode 200 containing encoded sensitive financial account information 61 of the consumer 18) to a Payment Platform 20 via the Terminal 12. For the purposes of providing a Consumer's Payment Account Identifier, it is contemplated that several Mobile Device technologies may be utilized, including Image Technology and Transmitting Technology. Where Image Technology is used, the Payment Account Identifier can be presented (e.g., in the form of a graphical image, such as a 1-D barcode, 2-D barcode or hologram) on the Consumer's Mobile Device 8 for scanning via the Terminal 12, whereas where Transmitting Technology is used, the Payment Account Identifier or the Payment Account Identifying Information is electronically communicated (e.g., via NFC, Bluetooth, Infrared or other similar short-range communication technology) from the Consumer's Mobile Device 8 to the Payment Platform 20 via the Terminal 12. The disclosed split mobile payment system 10 allows the Consumer 18 to pay for his/her purchase by charging the purchase amounts to one or several of his/her Payment Accounts 72 accessible via the Payment Platform 20.

The disclosed system utilizes a "Split Transaction Process" that divides the sensitive parts of an electronic POS payment process between the Terminal 12, the Consumer's Mobile Device 8 and the Payment Platform 20. Specifically, the disclosed system 10 provides that the steps of a POS payment process which involve sensitive Payment Account Information 61 of the Consumer 18 (including for example Payment Account account number(s), Payment Account balances, Payment Account passwords and/or and Payment Account PINs) are processed between the Consumer's Mobile Device 8 and the Payment Platform 20, thereby avoiding the Consumer 18 having to expose any confidential credit card, debit card or financial information 61 to the merchant 16. Nor does it need the Consumer 18 to enter any credit card or debit card PINs into the merchant's Terminal 12. All sensitive Payment Accounts and Payment Account Information 61 is housed on the Payment Platform 20 and therefore access to such sensitive information 61 is restricted from the merchant 16 and the merchant computer systems 12.

Figure 9:
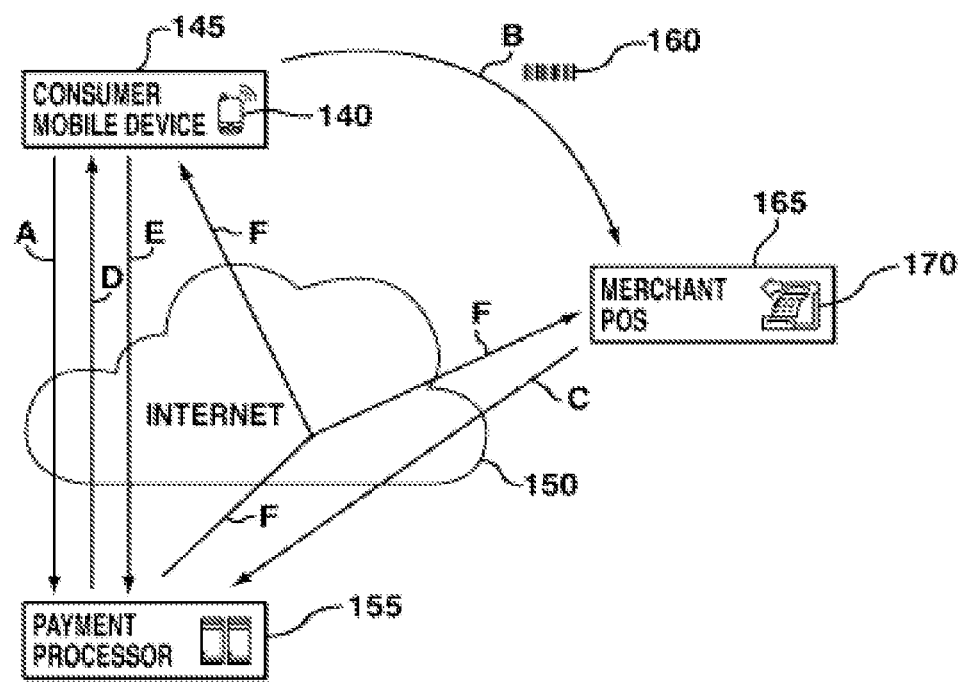
FIG. 9 is an example operation of the system of FIG. 3.

The steps involved in an exemplary payment transaction 5 utilizing the Split Mobile Payment System 10 is described below, with reference to FIGS. 3 and 9.

1. After having selected the goods and/or services he/she wishes to purchase, the Consumer 18 proceeds to the check-out area in the merchant's 16 store.

2. The cashier may ring in the items and calculate the total amount the Consumer 18 must pay (per-item cost plus taxes, typically).

3. At this point the Consumer 18 may login to his/her Mobile Device 140 and start the MPA 145 (e.g. payment application 13) on the Mobile Device 140.

4. Before proceeding, the MPA 145 may authenticate the Consumer 18 through a standard password prompt or similar method.

5. The MPA 145 may confirm the authentication by communicating with the Payment Platform 155 (e.g. payment service platform 20) back-end servers via the Internet 150. (Step A).

6. Upon successful authentication, the MPA 145 can display the Consumer's 18 unique identifying barcode 160 (or other Image Technology) (or optionally the code data 4) on the screen of the Mobile Device 140. The barcode 160 (or optionally the code data 4) will contain the Consumer's Payment Account Identifying Information. (Step B).

7. The Consumer 18 can present the barcode 160 on the screen of his/her Mobile Device 140 to be scanned by an image scanner 118 at the cashier of the PPA 165 (e.g. merchant application 14). It is contemplated that the Terminal 170 can incorporate image scanning functionality so as to function as a suitable image scanner, or the image scanner may be a separate device in communication with the PPA 165.

8. After successfully reading the barcode 160 or receiving the Payment Account Identifying Information (e.g. the code data 4), the PPA 165 can initiate a purchase transaction request 5 to the Payment Platform server 155 (e.g. device 6) via the Internet 150 using the network connection 0 (or optionally through a dedicated connection). This purchase transaction request 5 may contain the Payment Account Identifying Information received from the Mobile Device 140, information about the purchase (e.g. transaction amount, items purchased, etc.) and/or information about the merchant (merchant identifier, merchant authentication key). (Step C).

9. The Payment Platform 155 can authenticate the merchant transaction request and notify (e.g. using the network connection 1 as a response to the purchase transaction request 5) the MPA 145 of the pending transaction via the Internet 160. The notification request may include the transaction information from the merchant 16 (e.g. transaction amount, merchant name and items being purchased). (Step D). Optionally, the Payment Platform 155 can also send a photo of the Consumer 18 to the PPA.

10. The MPA 145 may then display on the Mobile Device 140, the transaction amount, the items being purchased (optional), the merchant 16 name and provide the Consumer 18 with the option of how he/she wishes to pay. The options presented will depend on options available to the particular Consumer 18. Typical payment methods include but are not limited to: E-wallet, coupon, gift-card, debit and credit card as selectable that pertain to the sensitive financial account information 61 of the consumer 18 known to the payment processor 155. Additional limitations on the options may be imposed based on funds available for each of the configured methods, currency, transaction amount or other parameters. In the case of gift-cards or coupons, the funds available to the Consumer 18 can be altered based on pre-defined properties of the coupon or gift-card. For example, a gift-card for Merchant X entered in the Consumer's account 72 on the Payment Platform 155 may only increase the funds available to the Consumer 18 when a purchase is being made at Merchant X.

11. The Consumer 18 can select their preferred Payment Account 72 via the MPA 145.

12. The MPA 145 can then return the Consumer's 18 selected option to the Payment Platform 155. (Step E).

13. In the event that the selected Payment Account 72 requires a PIN verification, the MPA 145 can prompt the Consumer 18 to enter the PIN number on the mobile device 140.

14. The MPA can send the entered PIN number to the Payment Platform 155 for authentication.

15. Upon successful authentication of the PIN, the Payment Platform 155 may then perform the requested financial transactions to charge the amount of the transaction to the Consumer's Payment Account 72 and credit that amount to the merchant 16, e.g. via the account processing system 2.

16. Upon completion of the transaction by the Payment Platform 155, both the merchant 16 and the MPA 145 may be updated with the transaction information (Step F), including but not limited to the following:
  Date and time
  Merchant name
  Transaction id
  Transaction amount
  Transaction status (approved, declined)
  Any other identifying information required by the merchant and governing POS standards.

17. The merchant 16 can be notified that the transaction 5 has been completed by the Payment Platform 155 responding to the initial transaction initiation request 5 (step 8) with the details listed above, for example using the network connection 0 as either a synchronous or asynchronous message in response to the original purchase transaction 5 request.

18. The MPA 145 can be notified by responding to the confirmation request (step 12) with the same details as are sent to the merchant 16, for example using the network connection 1 as either a synchronous or asynchronous message in response to the original confirmation request of step D above.

19. The PPA Terminal 170 can print out a receipt confirming completion of the transaction for the Consumer's 18 reference.

20. The MPA 145 may also display the results of the transaction on the Mobile Device's 8 screen.

21. A confirmation e-mail can be sent to the Consumer's 18 registered e-mail address (e.g. of the device 8).

22. In an embodiment, the transaction 5 is now completed and the Consumer 18 has paid for the purchase.

In an alternative embodiment, where Transmitting Technology is used instead of Image Technology, steps 6 and 7 above could simply be replaced by the following step:

6. Upon successful authentication, the MPA 145 may have the Mobile Device 140 transmit the Consumer's Payment Account Identifier or Payment Account Identifying Information using the Transmitting Technology to the PPA via the PPA Terminal. (Step B).

As will be apparent to one skilled in the art, the disclosed split mobile payment system 10 provides (or can be configured to provide) a number of notable advantages/features over the prior art, including but not limited to the following:

1. It can inhibit credit card/debit card PIN numbers from being stolen by unscrupulous merchants or merchant employees, since PIN numbers are only required to be entered into the Consumer's Mobile Device and not a merchant POS terminal.

2. It can inhibit credit card information from being stolen or misused by merchants or merchant employees, since a payment card isn't required to be physically presented to the merchant or to be swiped by the merchant.

3. In the case of an ATM implementation where bank ATM machine functionality is transferred to the MPA, it can inhibit bank card PIN numbers from being stolen, thereby making it difficult to clone a Consumer's bank card.

4. It optionally provides Account Holder identification, by providing the merchant with "out-of-band" photo ID of the Account Holder for verification purposes. The Account Holder's photo is delivered to the merchant from the Payment Platform, rather than being located on the barcode or Mobile Device, where a thief could potentially change it to his/her own photo.

5. It can inhibit fraud by needing the Consumer to have his/her Mobile Device in his/her possession and to know the PIN number. This inhibits a thief from cloning the barcode and trying to use it on another Mobile Device.

6. It can provide the Consumer with real-time notification of account misuse. Since all requests for payment are pushed to the Consumers Mobile Device, if a consumer's barcode was cloned and someone else tried to use it on another Mobile Device, the request for payment confirmation would be sent to the Consumer's Mobile Device, thus allowing them to stop and report the transaction.

7. It can free the Consumer from having to carry payment cards and/or a cheque book.

8. It can reduce the check out time at a POS/cashier.

9. It can allow for the real-time digital issuing of gift certificates and coupons.

10. It can allow a Consumer to buy someone else a beer or any other goods or service as per the process outlined in step 9 remotely.

11. It can allow for a funds transfer to be sent from one person to another for use at a specific location. Since all merchants have a unique Merchant ID, a person-to-person funds transfer can be initiated by the MPA that is tagged to a Merchant ID, meaning the funds can only be spent at that specific merchant.

12. The split mobile payment system 10 can be adapted to allow a parent to give young children a copy of his/her barcode 200 and/or code data 4 that they can use (e.g., a paper copy or a copy on a piece of clothing, etc.). All transaction requests would go back to the parent's Mobile Device 8 for authorization, such that the processing of the purchase transaction 5 would be between the devices 6,8 and 6,12 as discussed above. In this case, the device or person (e.g. child) providing the code data 4 and/or barcode 200 to the merchant application 14 is other than the owner of the device 8 (e.g. the parent of the child).

Further, referring to FIG. 3, the split transaction system 10 coordinates processing of the purchase transaction 5 between the merchant 16 and the consumer 18 over the communications network 11 by: the payment service platform 20 (via the transaction interface 15) receiving the purchase transaction 5 from the merchant 16 including merchant identification information (e.g. product data, funds amount data, and/or merchant ID data including financial account information, etc.) and consumer identification information (e.g. code data 4 and/or sensitive financial account information encoded in the barcode 200), such that the consumer identification information includes consumer financial account information (e.g. code data 4 and/or sensitive financial account information 61 encoded in the barcode 200) that is unusable to directly access the corresponding financial account 72 of the consumer 18; contacting the consumer 18 to notify the consumer 18 of the received purchase transaction 5 and to request confirmation information (such as confirmation of the funds amount associated with the purchase transaction 5, selection of a financial account 72 type, and/or PIN or password data) from the consumer 18; receiving the confirmation information from the consumer 18 and generating a corresponding funds transfer request using a funds amount 203 associated with the merchant identification information and a financial account number of the financial account 72 of the consumer 18; and sending the funds transfer request to the account processing system 2 for subsequent settlement of the funds amount 203 with the financial account 72 of the consumer 18. It is recognized that the financial account 72 number (e.g. sensitive data 61) is obtained either directly from the barcode 200 once decoded or using the code data 4 in the lookup table 63

Further, referring to FIG. 3, the split transaction system 10 coordinates processing of the purchase transaction 5 between the merchant 16 and the consumer 18 over the communications network 11 by: providing consumer identification information (e.g. code data 4 and/or sensitive financial account information 61 encoded in the barcode 200) to the merchant 16, such the consumer identification includes consumer financial account information that is unusable to directly access the corresponding financial account 72 of the consumer 18; receiving by the payment application 13 a notification from the payment service platform 20 of the purchase transaction 5 including merchant identification information and a request to provide confirmation information from the consumer 18 pertaining to the purchase transaction 5; sending by the payment application 13 the confirmation information to the payment service platform 20 including confirmation of the funds amount 203 associated with the merchant identification information; and receiving notification from the payment service platform 20 by the payment application 13 of subsequent settlement of the funds amount 203 with the financial account 72 number pertaining to the financial account 72 of the consumer 18.

The embodiments described herein are illustrative of the present disclosure and are not intended to limit the scope of the disclosure to the particular embodiments described. It will be appreciated by those skilled in the art that various changes can be made therein without departing from the spirit of the disclosure.

I claim:

1. A split transaction server coordinating processing of a purchase transaction between a merchant and a consumer over a network with interaction involving the server, a merchant device, and a consumer device, the split transaction server comprising:
   a computer processor coupled to a memory, wherein the computer processor is programmed to coordinate processing of the purchase transaction by:
   receiving by the computer processor the purchase transaction via a network communications module as initiated from the merchant device over the network including merchant information and consumer information, such that the consumer information is encoded information unusable by the merchant to directly access through a payment processing system a financial account of the consumer and the merchant information includes information associated with a merchant financial account;
   decoding by the computer processor the encoded information and retrieving, via a lookup from a consumer profile, consumer financial account information using the decoded information to directly access through the payment processing system the financial account of the consumer;
   retrieving by the computer processor contact information for the consumer device from the memory based on the consumer information received from the merchant;
   generating by the computer processor by the network communications module a configured notification that includes the consumer information with a request for entry of confirmation information from the consumer device for the purchase transaction;
   contacting directly by the computer processor a consumer program application of the consumer device using the contact information for the consumer device retrieved using the consumer information associated with said decoding by sending the configured notification for display on a user interface of the consumer device requesting entry of the confirmation information for the purchase transaction from the user interface based on the configured notification;
   receiving by the computer processor the confirmation information from the consumer device and generating a corresponding funds transfer request between the merchant financial account and the financial account of the consumer using a funds amount;
   sending the funds transfer request by the computer processor to an account processing system for subsequent settlement of the funds amount with the financial account of the consumer; and
   sending by the computer processor the approval or the denial of the purchase transaction to at least one of the consumer or the merchant.

2. The server of claim 1, wherein the encoded consumer financial account information is an optical machine readable image containing an encoded version of a financial account number encoded in symbology information of the optical machine readable image.

3. The server of claim 2, wherein the computer processor is further programmed to: decode the symbology information into unencoded information using a coding scheme of the optical machine readable image as a barcode in order to extract the financial account of the consumer.

4. The server of claim 1, wherein the purchase transaction is received from a first network connection with a network device of the merchant and the confirmation information is received from a second network connection with a network device of the consumer, such that the first network connection and the second network connection are associated with different network devices.

5. The server of claim 1, wherein the computer processor is further programmed to: receive a PIN from a network device of the consumer in response to the confirmation information request.

6. The server of claim 1 further comprising receiving by the computer processor a selected financial account type from a network device of the consumer in response to the confirmation information request, the selected financial account type one of a plurality of account types stored in the consumer profile.

7. The split transaction server of claim 1 further comprising: using by the computer processor the consumer information to obtain an image of the consumer from the consumer profile and sending the image to the merchant device over the network in order to verify an identity of the consumer with the merchant.

8. The split transaction server of claim 1 further comprising identifying a funds amount of the purchase transaction in the encoded information once decoded, the funds amount provided by the consumer in the encoded information.

9. A method for coordinating processing of a purchase transaction between a merchant and a consumer over a network with interaction involving a split transaction server, a merchant device and a consumer device, the split transaction method implementing stored instructions by a computer processor to perform the following steps of:

receiving by the computer processor the purchase transaction via a network communications module as initiated from the merchant device over the network including merchant information and consumer information, such that the consumer information is encoded information unusable by the merchant to directly access through a payment processing system a financial account of the consumer and the merchant information includes information associated with a merchant financial account;

decoding by the computer processor the encoded information and retrieving, via a lookup from a consumer profile, consumer financial account information using the decoded information to directly access through the payment processing system the financial account of the consumer;

retrieving by the computer processor contact information for the consumer device from the memory based on the consumer information received from the merchant;

generating by the computer processor by the network communications module a configured notification that Includes the consumer information with a request for entry of confirmation information from the consumer device for the purchase transaction;

contacting directly by the computer processor a consumer program application of the consumer device using the contact information for the consumer device retrieved using the consumer information associated with said decoding by sending the configured notification for display on a user interface of the consumer device requesting entry of the confirmation information for the purchase transaction from the user interface based on the configured notification;

receiving by the computer processor the confirmation information from the consumer device and generating a corresponding funds transfer request between the merchant financial account and the financial account of the consumer using a funds amount;

sending the funds transfer request by the computer processor to an account processing system for subsequent settlement of the funds amount with the financial account of the consumer; and sending by the computer processor the approval or the denial of the purchase transaction to at least one of the consumer or the merchant.

10. The method of claim 9, wherein the encoded consumer financial account information is an optical machine readable image containing an encoded version of a financial account number encoded in symbology information of the optical machine readable image.

11. The method of claim 10, wherein the computer processor is further programmed to: decode the symbology information into unencoded information using a coding scheme of the optical machine readable image as a barcode in order to extract the financial account of the consumer.

12. The method of claim 9, wherein the purchase transaction is received from a first network connection with a network device of the merchant and the confirmation information is received from a second network connection with a network device of the consumer, such that the first network connection and the second network connection are associated with different network devices.

13. The method of claim 9, wherein the computer processor is further programmed to: receive a PIN from a network device of the consumer in response to the confirmation information request.

14. The method of claim 9 further comprising receiving by the computer processor a selected financial account type from a network device of the consumer in response to the confirmation information request, the selected financial account type one of a plurality of account types stored in the consumer profile.

15. A split transaction server coordinating processing of a purchase transaction between a merchant and a consumer over a network with interaction involving the server, a merchant device, and a consumer device, the split transaction server comprising:

a computer processor coupled to a memory, wherein the computer processor is programmed to coordinate processing of the purchase transaction by:

receiving by the computer processor the purchase transaction via a network communications module as initiated from the merchant device over the network including merchant information and consumer information, such that the consumer information is encoded information unusable by the merchant to directly access through a payment processing system a financial account of the consumer and the merchant information includes information associated with a merchant financial account;

decoding by the computer processor the encoded Information and retrieving, via a lookup from a consumer profile, consumer financial account Information using the decoded Information to directly access through the payment processing system the financial account of the consumer;

retrieving by the computer processor contact information for the consumer device from the memory based on the consumer information received from the merchant;

generating by the computer processor by the network communications module a configured notification that includes the consumer information with a request for entry of confirmation information of account type from the consumer device for the purchase transaction;

contacting directly by the computer processor a consumer program application of the consumer device using the contact information for the consumer device retrieved using the consumer information associated with said decoding by sending the configured notification for display on a user interface of the consumer device requesting entry of the confirmation information for the purchase transaction from the user interface based on the configured notification, the confirmation information including a request for a selected financial account type from a plurality of financial account types stored in the consumer profile;

receiving by the computer processor the confirmation information from the consumer device including the selected financial account type and generating a corresponding funds transfer request between the merchant financial account and the financial account of the consumer pertaining to the selected financial account type using a funds amount;

sending the funds transfer request by the computer processor to an account processing system for subsequent settlement of the funds amount with the financial account of the consumer; and sending by the computer processor the approval or the denial of the purchase transaction to at least one of the consumer or the merchant.

16. The split transaction server of claim 15, wherein the plurality of financial account types is limited based on availability with the merchant.

17. The split transaction server of claim 16, wherein the confirmation information includes password information for the selected financial account type.

18. The split transaction server of claim 16, wherein the funds amount is obtained from the encoded information.

19. The split transaction server of claim 15 further comprising: using by the computer processor the consumer information to obtain an image of the consumer from the consumer profile and sending the image to the merchant device over the network in order to verify an identity of the consumer with the merchant.

* * * * *